(12) United States Patent
Rodman et al.

(10) Patent No.: US 8,934,381 B2
(45) Date of Patent: *Jan. 13, 2015

(54) CONFERENCE ENDPOINT INSTRUCTING A REMOTE DEVICE TO ESTABLISH A NEW CONNECTION

(75) Inventors: Jeffrey Rodman, San Francisco, CA (US); David Drell, Austin, TX (US)

(73) Assignee: Polycom, Inc., San Jose, CA (US)

( * ) Notice: Subject to any disclaimer, the term of this patent is extended or adjusted under 35 U.S.C. 154(b) by 1914 days.

This patent is subject to a terminal disclaimer.

(21) Appl. No.: 11/080,985

(22) Filed: Mar. 15, 2005

(65) Prior Publication Data

US 2005/0213728 A1 Sep. 29, 2005

Related U.S. Application Data

(63) Continuation-in-part of application No. 10/335,108, filed on Dec. 31, 2002, now Pat. No. 7,221,663, which is a continuation-in-part of application No. 10/378,709, filed on Mar. 3, 2003, which is a (Continued)

(51) Int. Cl.
*H04L 12/16* (2006.01)
*H04L 12/66* (2006.01)
(Continued)

(52) U.S. Cl.
CPC ...... *H04L 12/66* (2013.01); *H04Q 2213/13106* (2013.01); *H04Q 2213/1324* (2013.01); *H04M 3/568* (2013.01); *H04M 2203/5036* (2013.01);
(Continued)

(58) Field of Classification Search
USPC .......... 370/260, 261, 262, 263, 264, 266, 270
See application file for complete search history.

(56) References Cited

U.S. PATENT DOCUMENTS

| 3,573,377 A | 4/1971 | Anderson et al. |
| 3,612,767 A | 10/1971 | Anderson et al. |

(Continued)

FOREIGN PATENT DOCUMENTS

| EP | 0 669 749 A1 | 8/1995 |
| EP | 0 680 190 | 11/1995 |

(Continued)

OTHER PUBLICATIONS

Mermelstein; "G.722, A New CCIT Coding Standard for Digital Transmission of Wideband Audio Signals;" IEEE Communications Magazine; Jan. 1988—vol. 26, No. 1.

(Continued)

*Primary Examiner* — Yong Zhou
(74) *Attorney, Agent, or Firm* — Wong, Cabello, Lutsch, Rutherford & Brucculeri, L.L.P.

(57) ABSTRACT

Disclosed herein are methods, systems, and devices for improved audio, video, and data conferencing. The present invention provides a conferencing system comprising a plurality of endpoints communicating data including audio data and control data according to a communication protocol. A local conference endpoint may control or be controlled by a remote conference endpoint. Data comprising control signals may be exchanged between the local endpoint and remote endpoint via various communication protocols. In other embodiments, the present invention provides for improved bridge architecture for controlling functions of conference endpoints including controlling functions of the bridge.

24 Claims, 20 Drawing Sheets

Related U.S. Application Data continuation-in-part of application No. 10/335,108, filed on Dec. 31, 2002, now Pat. No. 7,221,663, application No. 11/080,985, filed on Mar. 15, 2005, which is a continuation-in-part of application No. 10/378,711, filed on Mar. 3, 2003, which is a continuation-in-part of application No. 10/335,108, filed on Dec. 31, 2002, now Pat. No. 7,221,663, application No. 11/080,985, which is a continuation-in-part of application No. 10/378,712, filed on Mar. 3, 2003, now Pat. No. 7,227,938, and a continuation-in-part of application No. 10/897,318, filed on Jul. 21, 2004, said application No. 10/378,712 is a continuation-in-part of application No. 10/335,108, filed on Dec. 31, 2002, now Pat. No. 7,221,663.

(60) Provisional application No. 60/345,929, filed on Dec. 31, 2001, provisional application No. 60/360,984, filed on Mar. 1, 2002, provisional application No. 60/653,657, filed on Feb. 15, 2005.

(51) Int. Cl.
*H04M 7/00* (2006.01)
*H04M 11/06* (2006.01)
*H04N 7/15* (2006.01)
*H04M 3/56* (2006.01)

(52) U.S. Cl.
CPC .......... *H04M 3/56* (2013.01); *H04Q 2213/1309* (2013.01); *H04M 7/0057* (2013.01); *H04M 7/006* (2013.01); *H04M 11/06* (2013.01); *H04N 7/152* (2013.01); *H04M 11/066* (2013.01); *H04M 3/567* (2013.01)
USPC ........................................................ 370/261

(56) References Cited

U.S. PATENT DOCUMENTS

| | | |
|---|---|---|
| 3,649,761 A | 3/1972 | Bush |
| 3,854,010 A | 12/1974 | Yoshino et al. |
| 3,927,269 A | 12/1975 | Yoshino et al. |
| 4,008,376 A | 2/1977 | Flanagan et al. |
| 4,058,769 A | 11/1977 | Alderman |
| 4,257,119 A | 3/1981 | Pitroda |
| 4,311,877 A | 1/1982 | Kahn |
| 4,351,062 A | 9/1982 | Yoshiya |
| 4,384,362 A | 5/1983 | Leland |
| 4,425,642 A | 1/1984 | Moses et al. |
| 4,541,118 A | 9/1985 | Eastmond et al. |
| 4,544,804 A | 10/1985 | Herr et al. |
| 4,763,317 A | 8/1988 | Lehman et al. |
| 4,782,521 A | 11/1988 | Bartlett et al. |
| 4,796,293 A | 1/1989 | Blinken et al. |
| 4,901,307 A | 2/1990 | Gilhousen et al. |
| 4,945,412 A | 7/1990 | Kramer |
| 4,995,071 A | 2/1991 | Weber et al. |
| 5,003,593 A | 3/1991 | Mihm, Jr. |
| 5,007,049 A | 4/1991 | Ohtsuka |
| 5,155,743 A | 10/1992 | Jacobs |
| 5,157,689 A | 10/1992 | Kurihara |
| 5,195,087 A | 3/1993 | Bennett et al. |
| 5,276,704 A | 1/1994 | Dixon |
| 5,353,373 A | 10/1994 | Drogo de Iacovo et al. |
| 5,434,913 A | 7/1995 | Tung et al. |
| 5,473,631 A | 12/1995 | Moses |
| 5,526,354 A | 6/1996 | Barraclough et al. |
| 5,530,699 A | 6/1996 | Kline |
| 5,572,247 A | 11/1996 | Montgomery et al. |
| 5,583,963 A | 12/1996 | Lozach |
| 5,598,429 A | 1/1997 | Marshall |
| 5,625,407 A * | 4/1997 | Biggs et al. ............... 348/14.11 |
| 5,677,728 A | 10/1997 | Schoolman |
| 5,687,095 A | 11/1997 | Haskell et al. |
| 5,724,383 A | 3/1998 | Gold et al. |
| 5,724,416 A | 3/1998 | Foladare et al. |
| 5,758,079 A | 5/1998 | Ludwig |
| 5,760,824 A | 6/1998 | Hicks, III |
| 5,761,239 A | 6/1998 | Gold et al. |
| 5,761,292 A | 6/1998 | Wagner et al. |
| 5,790,591 A | 8/1998 | Gold et al. |
| 5,790,652 A | 8/1998 | Gulley et al. |
| 5,822,360 A | 10/1998 | Lee et al. |
| 5,835,129 A | 11/1998 | Kumar |
| 5,841,763 A | 11/1998 | Leondires et al. |
| 5,844,600 A | 12/1998 | Kerr |
| 5,855,502 A | 1/1999 | Truchsess |
| 5,886,734 A | 3/1999 | Ozone et al. |
| 5,894,321 A | 4/1999 | Downs et al. |
| 5,914,940 A | 6/1999 | Fukuoka et al. |
| 5,916,302 A | 6/1999 | Dunn et al. |
| 5,943,337 A * | 8/1999 | Sasagawa ................. 370/395.3 |
| 5,950,125 A * | 9/1999 | Buhrmann et al. ........ 455/432.1 |
| 5,963,246 A | 10/1999 | Kato |
| 5,983,192 A | 11/1999 | Botzko et al. |
| 5,983,261 A | 11/1999 | Riddle |
| 5,991,385 A | 11/1999 | Dunn et al. |
| 5,999,207 A | 12/1999 | Rodriguez et al. |
| 5,999,966 A | 12/1999 | McDougall et al. |
| 6,049,531 A | 4/2000 | Roy |
| 6,088,347 A | 7/2000 | Minn et al. |
| 6,088,368 A | 7/2000 | Rubinstain et al. |
| 6,094,213 A | 7/2000 | Mun et al. |
| 6,108,327 A | 8/2000 | Schilling et al. |
| 6,111,936 A | 8/2000 | Bremer |
| 6,122,259 A | 9/2000 | Ishida |
| 6,130,880 A | 10/2000 | Naudus et al. |
| 6,134,223 A | 10/2000 | Burke et al. |
| 6,148,068 A | 11/2000 | Lowery et al. |
| 6,151,578 A | 11/2000 | Bourcet et al. |
| 6,154,484 A | 11/2000 | Lee et al. |
| 6,154,524 A | 11/2000 | Bremer |
| 6,170,011 B1 | 1/2001 | Macleod Beck et al. |
| 6,178,237 B1 | 1/2001 | Horn |
| 6,185,285 B1 | 2/2001 | Relyea et al. |
| 6,192,395 B1 | 2/2001 | Lerner et al. |
| 6,201,859 B1 | 3/2001 | Memhard et al. |
| 6,202,084 B1 | 3/2001 | Kumar et al. |
| 6,208,372 B1 | 3/2001 | Barraclough |
| 6,230,197 B1 | 5/2001 | Beck et al. |
| 6,236,854 B1 | 5/2001 | Bradshaw, Jr. |
| 6,262,978 B1 | 7/2001 | Bruno et al. |
| 6,272,176 B1 | 8/2001 | Srinivasan |
| 6,301,339 B1 | 10/2001 | Staples et al. |
| 6,327,567 B1 | 12/2001 | Willehadson et al. |
| 6,332,006 B1 | 12/2001 | Rydbeck et al. |
| 6,343,313 B1 | 1/2002 | Salesky et al. |
| 6,345,047 B1 | 2/2002 | Regnier |
| 6,366,570 B1 | 4/2002 | Bhagalia |
| RE37,802 E | 7/2002 | Fattouche et al. |
| 6,421,355 B1 | 7/2002 | Quiring et al. |
| 6,442,190 B1 | 8/2002 | Nguyen |
| 6,442,272 B1 | 8/2002 | Osovets |
| 6,453,022 B1 | 9/2002 | Weinman, Jr. |
| 6,453,336 B1 | 9/2002 | Beyda et al. |
| 6,501,739 B1 | 12/2002 | Cohen |
| 6,501,740 B1 | 12/2002 | Sun et al. |
| 6,526,385 B1 | 2/2003 | Kobayashi et al. |
| 6,553,062 B1 | 4/2003 | Marum |
| 6,580,789 B1 | 6/2003 | Simpson et al. |
| 6,584,138 B1 | 6/2003 | Neubauer et al. |
| 6,597,667 B1 | 7/2003 | Cerna |
| 6,628,644 B1 | 9/2003 | Nelson et al. |
| 6,628,768 B1 | 9/2003 | Ramaswamy et al. |
| 6,661,833 B1 | 12/2003 | Black et al. |
| 6,671,263 B1 | 12/2003 | Potter et al. |
| 6,728,222 B1 | 4/2004 | Ono |
| 6,728,367 B1 | 4/2004 | Swam |
| 6,731,609 B1 | 5/2004 | Hirni et al. |
| RE38,523 E | 6/2004 | Ozluturk |
| 6,765,895 B1 | 7/2004 | Watanabe |
| 6,792,092 B1 | 9/2004 | Michalewicz |

(56) References Cited

U.S. PATENT DOCUMENTS

| | | | |
|---|---|---|---|
| 6,798,753 B1 | 9/2004 | Doganata et al. |
| 6,807,563 B1 | 10/2004 | Christofferson et al. |
| 6,810,116 B1 | 10/2004 | Sorensen et al. |
| 6,812,955 B2 | 11/2004 | Takaki et al. |
| 6,885,652 B1 | 4/2005 | Ozukturk et al. |
| 6,888,935 B1 | 5/2005 | Day |
| 6,898,620 B1 | 5/2005 | Ludwig et al. |
| 6,931,113 B2 | 8/2005 | Ortel |
| 6,940,826 B1 | 9/2005 | Simard et al. |
| 6,978,001 B1 | 12/2005 | Shaffer et al. |
| 7,003,042 B2 | 2/2006 | Morelos-Zaragosa et al. |
| 7,006,456 B2 | 2/2006 | Rabipour et al. |
| 7,006,616 B1 | 2/2006 | Christofferson et al. |
| 7,007,235 B1 | 2/2006 | Hussein et al. |
| 7,099,448 B1 | 8/2006 | Laniepce et al. |
| 7,107,312 B2 | 9/2006 | Hackbarth et al. |
| 7,185,054 B1 | 2/2007 | Ludwig et al. |
| 7,221,663 B2 | 5/2007 | Rodman et al. |
| 7,227,938 B2 | 6/2007 | Rodman et al. |
| 7,302,050 B1 | 11/2007 | Michalewicz |
| 7,317,791 B2 | 1/2008 | Carlson |
| 7,339,605 B2 | 3/2008 | Rodman et al. |
| 7,366,907 B1 | 4/2008 | Ezaki |
| 7,386,026 B1 | 6/2008 | Gold |
| 7,428,223 B2 | 9/2008 | Nierhaus et al. |
| 7,519,098 B2 | 4/2009 | Schilling |
| 7,526,078 B2 | 4/2009 | Rodman et al. |
| 7,633,996 B2 | 12/2009 | Haentzschel et al. |
| 7,689,568 B2 | 3/2010 | Lee et al. |
| 7,814,150 B1 | 10/2010 | Sonnenfeldt et al. |
| 2001/0008556 A1 | 7/2001 | Bauer et al. |
| 2001/0016038 A1 | 8/2001 | Sammon et al. |
| 2001/0033613 A1 | 10/2001 | Vitenberg |
| 2001/0043571 A1* | 11/2001 | Jang et al. ............ 370/260 |
| 2002/0018117 A1 | 2/2002 | Tosaya |
| 2002/0034166 A1 | 3/2002 | Barany et al. |
| 2002/0071026 A1 | 6/2002 | Agraharam et al. |
| 2002/0083462 A1 | 6/2002 | Arnott |
| 2002/0093985 A1 | 7/2002 | Nimmagadda |
| 2002/0097679 A1 | 7/2002 | Berenbaum |
| 2002/0122429 A1 | 9/2002 | Griggs |
| 2002/0131377 A1 | 9/2002 | DeJaco et al. |
| 2002/0151294 A1 | 10/2002 | Kirby et al. |
| 2002/0188731 A1 | 12/2002 | Potekin et al. |
| 2003/0016676 A1 | 1/2003 | Allen et al. |
| 2003/0048353 A1 | 3/2003 | Kenoyer et al. |
| 2003/0053443 A1 | 3/2003 | Owens |
| 2003/0072429 A1 | 4/2003 | Slobodin et al. |
| 2003/0091244 A1 | 5/2003 | Schnee et al. |
| 2003/0112947 A1 | 6/2003 | Cohen |
| 2003/0114122 A1 | 6/2003 | Strakovsky |
| 2003/0123645 A1 | 7/2003 | Comisky |
| 2003/0142635 A1 | 7/2003 | Roher et al. |
| 2003/0179859 A1 | 9/2003 | Chea et al. |
| 2004/0003045 A1* | 1/2004 | Tucker et al. ............ 709/205 |
| 2004/0012669 A1 | 1/2004 | Drell et al. |
| 2004/0022272 A1 | 2/2004 | Rodman et al. |
| 2004/0125932 A1 | 7/2004 | Orbach et al. |
| 2004/0213474 A1 | 10/2004 | Kato |
| 2005/0014491 A1 | 1/2005 | Johnson |
| 2005/0018756 A1 | 1/2005 | Nuytkens et al. |
| 2005/0149876 A1 | 7/2005 | Kortum et al. |
| 2005/0157777 A1 | 7/2005 | Mizuno |
| 2005/0185602 A1 | 8/2005 | Simard et al. |
| 2005/0206721 A1 | 9/2005 | Bushmitch et al. |
| 2005/0207554 A1 | 9/2005 | Ortel |
| 2005/0212908 A1 | 9/2005 | Rodman et al. |
| 2005/0213517 A1 | 9/2005 | Rodman et al. |
| 2005/0213725 A1 | 9/2005 | Rodman |
| 2005/0213726 A1 | 9/2005 | Rodman et al. |
| 2005/0213728 A1 | 9/2005 | Rodman et al. |
| 2005/0213729 A1 | 9/2005 | Rodman et al. |
| 2005/0213730 A1 | 9/2005 | Rodman et al. |
| 2005/0213731 A1 | 9/2005 | Rodman et al. |
| 2005/0213732 A1 | 9/2005 | Rodman |
| 2005/0213733 A1 | 9/2005 | Rodman et al. |
| 2005/0213734 A1 | 9/2005 | Rodman et al. |
| 2005/0213735 A1 | 9/2005 | Rodman et al. |
| 2005/0213736 A1 | 9/2005 | Rodman et al. |
| 2005/0213737 A1 | 9/2005 | Rodman et al. |
| 2005/0213738 A1 | 9/2005 | Rodman et al. |
| 2005/0213739 A1 | 9/2005 | Rodman et al. |
| 2005/0232166 A1 | 10/2005 | Nierhaus |
| 2005/0254558 A1 | 11/2005 | Dutka |
| 2005/0271194 A1 | 12/2005 | Woods et al. |
| 2005/0281319 A1 | 12/2005 | Schilling |
| 2006/0098692 A1 | 5/2006 | D'Angelo |
| 2006/0109890 A1 | 5/2006 | Willenegger |
| 2006/0222155 A1 | 10/2006 | Summers et al. |
| 2008/0144701 A1 | 6/2008 | Gold |
| 2009/0132391 A1 | 5/2009 | Jacobs |

FOREIGN PATENT DOCUMENTS

| | | |
|---|---|---|
| EP | 1 006 706 | 7/2003 |
| JP | 05300509 | 12/1993 |
| JP | 08125738 | 5/1996 |
| JP | 10042264 | 2/1998 |
| RU | 2 096 921 | 11/1997 |
| WO | 94/18779 | 8/1994 |
| WO | 98/19458 | 5/1998 |
| WO | 99/12351 | 3/1999 |
| WO | 0054502 | 9/2000 |

OTHER PUBLICATIONS

Schulzrinne; "Voice Communication Across the Internet: A Network Voice Terminal;" 1992, pp. 1-34, Amherst, MA.

Haojun; "Implementing an Audio Multipoint Processor on DSP Array;" 2001, pp. 441-444.

Jung; "The Multimedia Desktop Conference System Adaptability in Network Traffic on LAN;" 1995; pp. 334-338, IEEE.

Noore; "Computer-Based Multimedia Video Conferencing System;" 1993; pp. 587-591.

Sasse; "Workstation-Based Multimedia Conferencing: Experiences from the MICE Project;" 1994; pp. 1-6.

User's Guide Administrator's Guide, SoundStation(R) VTX 1000 Operation Manual, (c)2003 Polycom, Inc.

Quick Installation Guide, Vortex(R)—Soundstation VTX 1000TM, (c)2004, Polycom, Inc.

J. Rodman, Polycom(R), White Paper—"The Power of Shared Resources: Conference Room Integration in the VTX/VSX Environment" Jun. 2, 2004, pp. 1-6.

J. Rodman, Polycom(R), White Paper—"The Distributed Dawn: the Emergence of Versatile Performance in the Conferencing Environment" Jun. 2, 2004, pp. 1-7.

H324 Videophones Standard; http://www.elextronika.com/tvphone/h324.htm; Retrieved Mar. 14, 2005; 4 pages.

International Telecommunication Union; ITU-T Telecommunication Standardization Sector of ITU H.324 (Mar. 2002) Series H: Audiovisual and Multimedia Systems Infrastructure of audiovisual services—Systems and terminal equipment for audiovisual services Terminal for low bit-rate multimedia Communication; ITU-T Recommendation H.324.

MultiTech(R) Systems; MultiModemDSVD Compact DSVD Modems; http://www.multitech.com/Products/Families/MultiModemDSVD; obtained Mar. 14, 2005.

DSVD and H324 Standards; TechOnLine—Modem and Fax Standards and Software; http://www.techonline.com/community/ed_resource/feature_article/20041; Obtained Mar. 14, 2005.

International Search Report received in corresponding International Application No. PCT/US02/41778 dated Jul. 17, 2003.

Search Report received in corresponding European Application No. 03743750.6-2414-PCT/US0306698 dated Mar. 16, 2005.

Search Report received in corresponding European Application No. 037260262-2414-US0306736 dated Mar. 10, 2005.

(56) References Cited

OTHER PUBLICATIONS

International Search Report received in corresponding International Application No. PCT/US01/51636 dated Sep. 26, 2002.

Mermelstein P.; "G.722, A New CCITT CCITT Coding Standard for Digital Transmission of Wideband Audio Signals;" IEEE Communications Magazine; 26(1) Jan. 1988; pp. 8-15.

Hering, et al.; "Safety and Security Increases for Air Traffic Management Through Unnoticeable Watermark Aircraft Identification Tag Transmitted with VHF Voice Communication" pp. 1-10; © 2003 IEEE.

CDMA Overview, Resources/Tutorials; http://www.telecomspace.com/cdma.html; Retrieved Sep. 24, 2006; 5 pages.

Spread spectrum—Wikipedia, the free encyclopedia; http://en.wikipedia.org/wiki/Spread_spectrum; retrieved Sep. 24, 2006; 4 pages.

Search Report received in corresponding European Application No. EP 02 72 8007 dated Sep. 26, 2006.

\* cited by examiner

Audio Signal Frequency Spectrum 1200

Portion of audio signal filtered out by notch filter 1300

1200

Audio Signal after Notch filter

Carrier Signal with Data 1400

CONFERENCE ENDPOINT INSTRUCTING A REMOTE DEVICE TO ESTABLISH A NEW CONNECTION

CROSS-REFERENCE TO RELATED APPLICATIONS

This application is also a continuation-in-part of U.S. application Ser. No. 10/335,108 filed Dec. 31, 2002, entitled "Method and Apparatus for Wideband Conferencing," which claims priority on U.S. Application No. 60/345,929 filed Dec. 31, 2001 and entitled "Method and Apparatus for IP Conferencing," and on U.S. Application No. 60/360,984 filed Mar. 1, 2002 and entitled "Systems and Methods for Video Conferencing Across a Network."

This application is also a continuation-in-part of U.S. application Ser. No. 10/378,709 filed Mar. 3, 2003, entitled "System and Method for Communicating Data during an Audio Conference," which is a continuation-in-part of U.S. application Ser. No. 10/335,108, and which claims priority on U.S. Application No. 60/360,984.

This application is also a continuation-in-part of U.S. application Ser. No. 10/378,711 filed Mar. 3, 2003, entitled "System and Method for Communication Channel and Device Control via an Existing Audio Channel," and is also a continuation-in-part of U.S. application Ser. No. 10/378,712 filed Mar. 3, 2003, entitled "System and Method for Dynamically Establishing Optimum Audio Quality in an Audio Conference," both of which are continuations-in-part of U.S. application Ser. No. 10/335,108, and which claims priority on U.S. Application No. 60/360,984.

This application is also a continuation-in-part of U.S. application Ser. No. 10/897,318 filed Jul. 21, 2004, entitled "A Conference Link between a Speakerphone and a Video Conference Unit."

The benefit of priority under 35 U.S.C. §120 is hereby claimed for the above-referenced applications. The contents of the above-referenced applications are hereby incorporated by reference.

This application claims the benefit under 35 U.S.C. §119 (e) of U.S. Provisional Patent Application Ser. No. 60/653,657 entitled "Systems, Methods, and Devices for Controlling Functions of a Conferencing Device," filed Feb. 15, 2005, which is hereby incorporated by reference.

This application claims the benefit under 35 U.S.C. §119 (e) of U.S. Provisional Patent Application Ser. No. 60/661,756 entitled "Speakerphone Transmitting URL Information to a Remote Device," filed Mar. 14, 2005, which is hereby incorporated by reference.

This application is related to U.S. application Ser. No. 10/144,561 filed May 10, 2002, entitled "Control Unit for Multipoint Multimedia/Audio System," which claims priority on U.S. Application No. 60/290,138 filed May 10, 2001 and entitled "Control Unit for Multipoint Multimedia/Audio," which is hereby incorporated by reference.

This application is related to the following applications, all of which were filed on Mar. 15, 2005, and whose disclosures are hereby incorporated by reference: U.S. patent application Ser. No. 11/081,081, entitled "Conference Endpoint Controlling Functions of a Remote Device,"; U.S. patent application Ser. No. 11/080,369, entitled "Conference Endpoint Controlling Audio Volume of a Remote Device,"; U.S. patent application Ser. No. 11/080,989, entitled "Conference Endpoint Instructing Conference Bridge to Dial Phone Number,"; U.S. patent application Ser. No. 11/080,993, entitled "Conference Endpoint Instructing Conference Bridge to Mute Participants,"; U.S. patent application Ser. No. 11/081,019, entitled "Conference Endpoint Requesting and Receiving Billing Information from a Conference Bridge,"; U.S. patent application Ser. No. 11/080,997, entitled "Speakerphone Transmitting URL Information to a Remote Device,"; U.S. patent application Ser. No. 11/080,988, entitled "Speakerphone Using a Secure Audio Connection to Initiate a Second Secure Connection,"; U.S. patent application Ser. No. 11/080,984, entitled "Speakerphone and Conference Bridge which Request and Perform Polling Operations,"; U.S. patent application Ser. No. 11/081,016, entitled "Speakerphone Transmitting Password Information to a Remote Device,"; U.S. patent application Ser. No. 11/080,995, entitled "Speakerphone and Conference Bridge which Receive and Provide Participant Monitoring Information,"; U.S. patent application Ser. No. 11/080,999, entitled "Speakerphone Establishing and Using a Second Connection of Graphics Information,"; U.S. patent application Ser. No. 11/080,994, entitled "Conference Bridge Which Decodes and Responds to Control Information Embedded in Audio Information,"; U.S. patent application Ser. No. 11/080,996, entitled "Conference Bridge Which Detects Control Information Embedded in Audio Information to Prioritize Operations,"; U.S. patent application Ser. No. 11/080,978, entitled "Conference Bridge Which Transfers Control Information Embedded in Audio Information Between,"; and U.S. patent application Ser. No. 11/080,977, entitled "Speakerphone Transmitting Control Information Embedded in Audio Information Through a Conference Bridge,".

BACKGROUND OF THE INVENTION

1. Field of the Invention

The present invention relates generally to the field of conferencing, and more particularly to systems, methods, and devices for controlling functions of an endpoint in an audio conference or a video conference and for using a protocol to communicate data during a conference.

2. Description of Related Art

Audio Conferencing and Video Conferencing

Conferencing enables geographically remote individuals or groups to communicate with each other from their respective locations. Conferencing serves a valuable purpose by reducing the time and expense required by traveling to meet in person. Accordingly, teleconferencing enables increased profitability, productivity, and efficiency within or among organizations. Conferencing also allows enterprises to speed decision-making and empower dispersed teams. Conferencing is particularly beneficial in the fields of business, medicine, education, and government.

In audio conferencing, speakerphones are examples of endpoint devices used to enable telephonic communication between participants at two or more sites. An example of a speakerphone is the POLYCOM® SOUNDSTATION® line of products. Video conferencing offers the additional ability to communicate graphic information and to view the facial expressions and body language of the conference participant(s) located at a remote site. Video conferencing offers the benefits of face-to-face communication without the inconvenience, expense, and uncertainty associated with traveling. An example of a video conferencing unit is the POLYCOM® VIEWSTATION® line of products.

Multimedia Conferencing and Data Conferencing

It is often desirable to send data to, and receive data from, another participating endpoint during a conference. For example, the data may include slide presentations or other documents related to the conference. In one prior art method, the data may be sent via the audio channel. However, conventional in-band signaling, such as DTMF (Dual-Tone Multi-Frequency) touchtone signaling, typically suffers from the disadvantages that it significantly disrupts a conversation (as the tones must be sufficiently loud to be received reliably), and the achievable data rate is limited.

In another prior art method, the data may be sent via a separate communication channel. For example, information may be exchanged among conference participants via fax, e-mail, or the World Wide Web. Establishing a separate communication channel often requires participants (or their assistants) to call one another to exchange capabilities, numbers, passwords, etc., and alert meeting participants when the connection is established and working. Disadvantageously, this type of communication can be disruptive and time consuming and can cause delays during the conference. The extra time associated with exchanging data via a separate channel can increase costs in terms of cost-per-minute as well as lost productivity.

Conferencing Management

Management of a multipoint conference bridge is required for a multipoint conference. Currently either in-band DTMF signaling or out-of-band Internet connections from a workstation are used. Using in-band DTMF signaling is both disruptive and limited in its capabilities. Using an Internet connection from a workstation requires access to a workstation, its connection and knowledge of the address of the bridge. Improved methods of managing a conference, including monitoring and controlling the various functions, are desirable to provide greater capabilities without requiring the use of a separate workstation.

SUMMARY OF THE INVENTION

A need has therefore arisen for a conferencing system that provides for improved capabilities for exchanging data. The present invention provides a conferencing system comprising a plurality of endpoints communicating data including control data according to a communication protocol. A local endpoint may control or be controlled by a remote endpoint. The endpoints may comprise speakerphones, IP telephones, cell phones, video conferencing units, computers, conference bridges, or other communication devices.

Data comprising control signals may be exchanged between an endpoint and a remote device via various communication protocols. In one embodiment, the protocol may be IP-based. In another embodiment, the protocol may be a modem protocol. In another embodiment, the protocol may be a serial I/O protocol. In another embodiment, the protocol may be according to ISDN (Integrated Services Digital Network) standards. In yet another embodiment the protocol may be analog. For all of the protocols the control data may be embedded in the audio information using Low Profile Signaling Protocol ("LPSP") techniques. For the IP, modem data, and serial I/O protocols, the control data may be provided in a channel separate from the audio channel. In one embodiment of the present invention, a speakerphone is provided which can communicate according to any of the aforementioned protocols.

In other embodiments, the present invention provides for bridge architecture for implementing the controlling of endpoint functions. The bridge comprises an embedded data unit which comprises a control unit. In some embodiments, the bridge detects the presence of embedded control data and decodes the data. In other embodiments, the bridge detects the presence of embedded control data but does not decode it.

DETAILED DESCRIPTION OF THE INVENTION

Figure 1A:
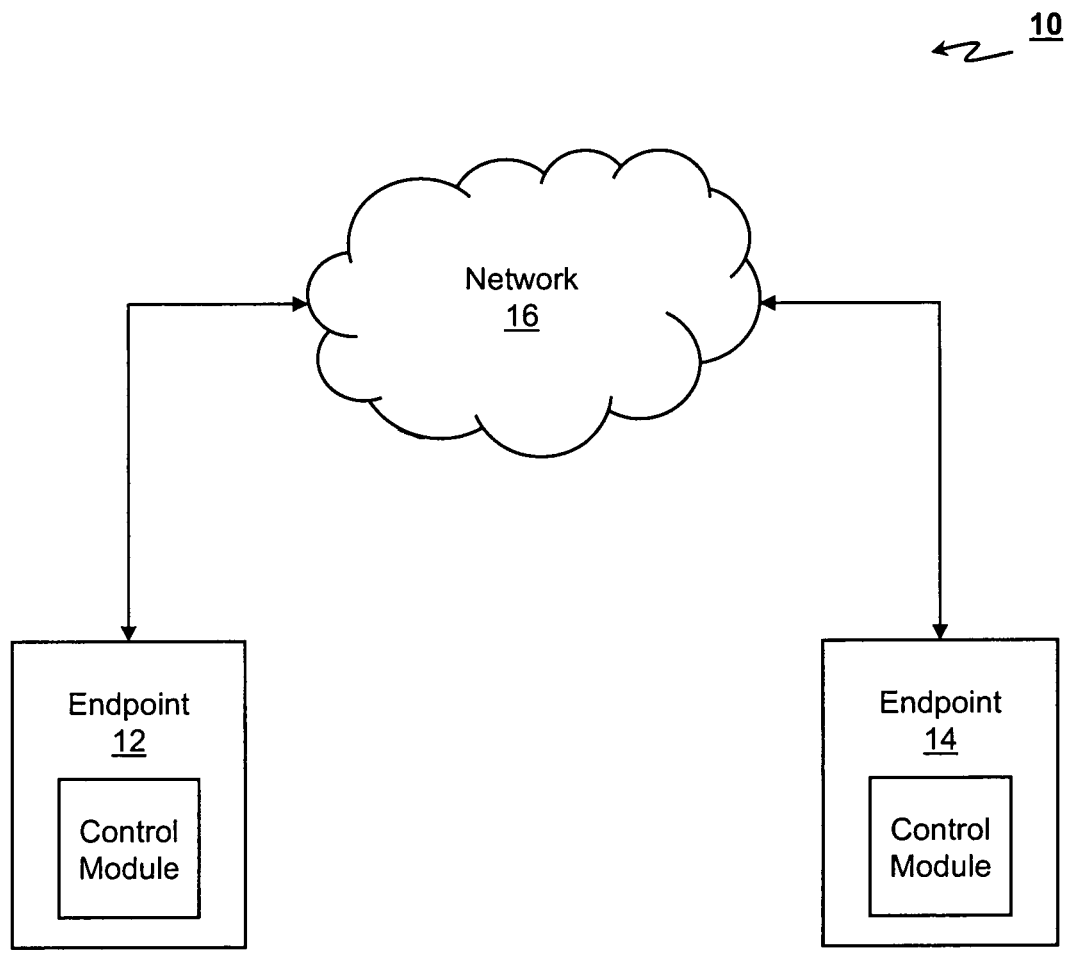
FIG. 1A depicts an exemplary block diagram of a conferencing system in accordance with one embodiment of the present invention.

As shown in the exemplary drawings wherein like reference numerals indicate like or corresponding elements among the figures, an embodiment of a system according to the present invention will now be described in detail.

I. Endpoint Controlling or Controlled by a Remote Device

Reference is now made to FIG. 1A, which depicts an exemplary block diagram of a conferencing system 10 in accordance with the principles of the present invention. The system comprises a plurality of conference endpoints 12 and 14. Each of the endpoints 12 and 14 can call and be called. Each of the endpoints 12 and 14 generates and/or terminates information streams. Each of the endpoints 12 and 14 comprises a control module. In accordance with the present invention, a local endpoint can control one or more functions of a remote endpoint by using control signals according to a certain protocol. Conversely, one or more functions of the local endpoint can be controlled by the remote endpoint by using control signals according to a certain protocol.

One or more of the endpoints 12 and 14 may comprise a speakerphone for use in an audio conference. A speakerphone is a telephone that includes at least a loudspeaker, a microphone, and one or more microprocessors. In the preferred embodiments the speakerphone allows full duplex operation and may include wide band operation. A speakerphone may also have various connections to another speakerphone. The connection may be via an analog Plain Old Telephone System ("POTS") line, a digital service line such as an Integrated Services Digital Network ("ISDN") line, or an Internet Protocol ("IP") connection, for example.

In addition, one or more of the endpoints 12 and 14 may comprise an IP telephone (sometimes referred to as "IP phone"). IP telephony refers to communications via an IP-based network such as the Internet or an intranet rather than the PSTN. An IP phone is a telephone that is capable of transporting voice over a network using IP-based data packets instead of circuit-switched connections over voice-only networks. In transmitting an IP call, the IP phone converts an analog signal to digital format and compresses/translates the signal into IP packets for transmission over the IP network. In receiving an IP call, the IP phone decompresses/translates a digital signal and converts the signal to analog format.

Figure 1B:
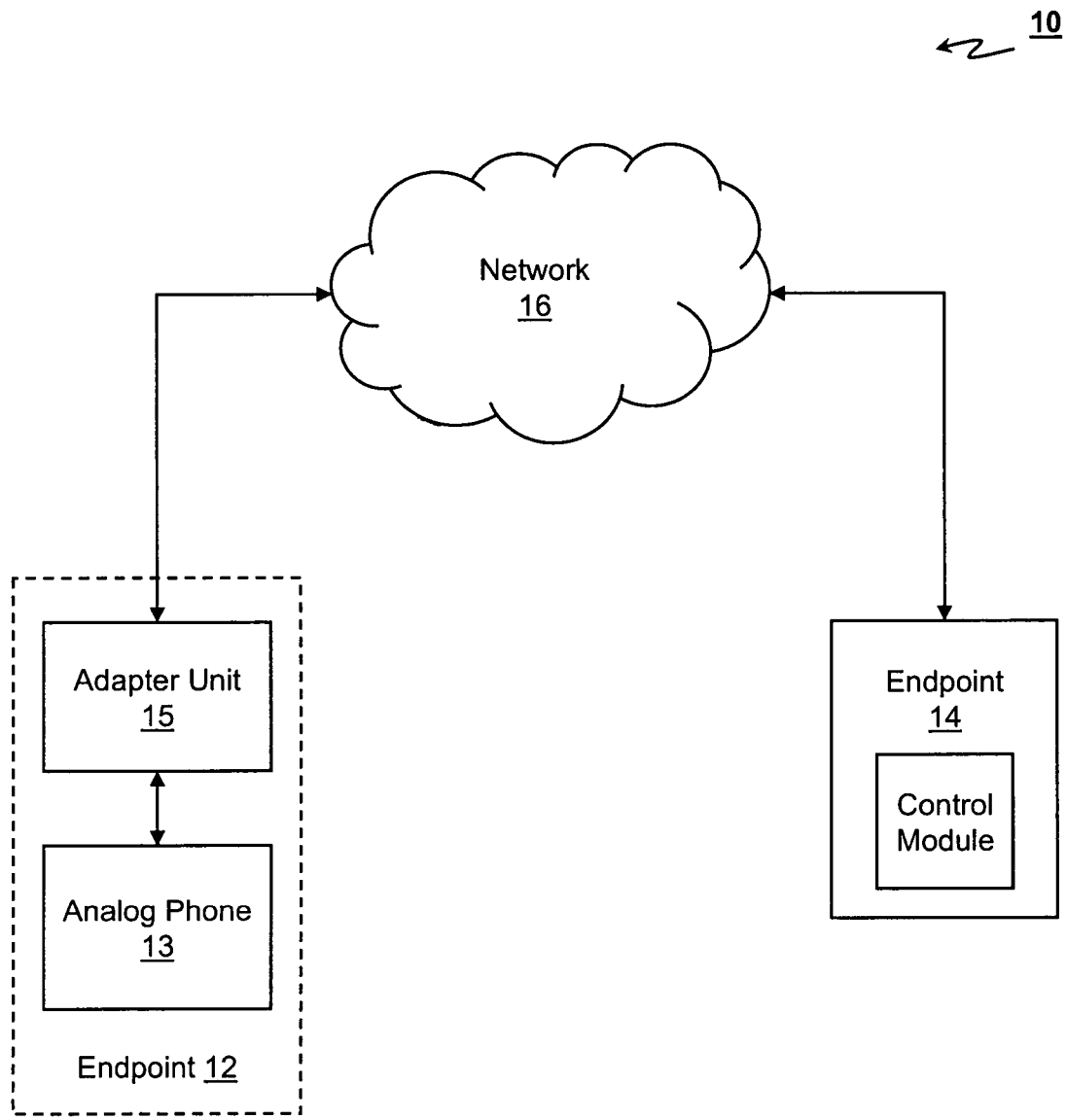
FIG. 1B depicts another exemplary block diagram of a conferencing system in accordance with one embodiment of the present invention.

One or more of the endpoints 12 and 14 may comprise an analog phone 13 coupled to an adapter unit 15, as shown in FIG. 1B. The adapter unit 15 is connected in series with the analog phone 13. The adapter unit 15 may be connected to the network 16 via POTS connection, or an IP connection, or a modem connection, etc. In accordance with certain embodiments of the present invention, the adapter unit 15 enables the endpoint 12 to embed a control signal in an outgoing audio signal, according to a low profile signaling protocol, as discussed further herein. The adapter unit 15 can also extract and decode a control signal from an incoming audio signal according to a low profile signaling protocol.

One or more of the endpoints 12 and 14 may also comprise a video conferencing unit ("VCU"). A VCU transmits, receives, and processes video images as well as audio signals. A VCU typically comprises a video processing component and an audio processing component. The video processing component may include a camera to capture live images of conference participants, and a video display for showing real-time video images of conference participants or images of documents. The audio processing component of a video conferencing unit may include one or more microphones and one or more loudspeakers. In one embodiment, for example, the endpoint 12 and/or the endpoint 14 of FIG. 1A may be embodied as the VCU depicted in FIG. 3 or may include an ISDN interface in place of the IP interface.

One or more of the endpoints 12 and 14 may also comprise a conference bridge. A bridge provides the capability for a multipoint conference (i.e., a conference among three or more sites), but can also be used for a point-to-point conference (i.e., a conference between two sites). A bridge may also be referred to as an MCU (multipoint conferencing unit or multi control unit).

Figure 2:
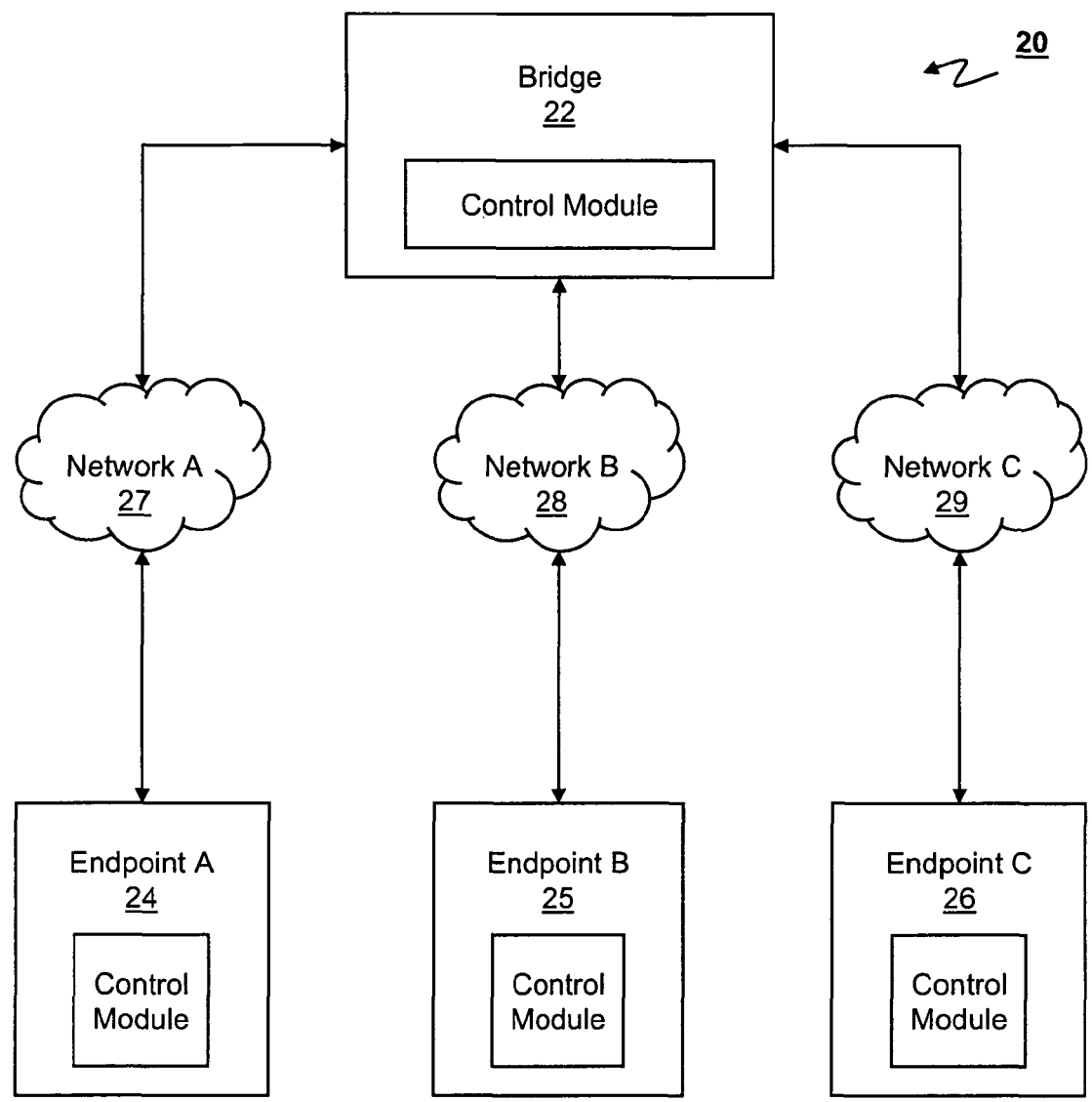
FIG. 2 depicts an exemplary block diagram of a multipoint conferencing system in accordance with one embodiment of the present invention.

FIG. 2 depicts a multipoint conferencing system 20, comprising a bridge 22 connected to multiple endpoints 24, 25, and 26 via networks 27, 28, and 29. The endpoints 24, 25, and 26 may communicate at different data rates and according to different coding standards. The bridge 22 facilitates transcoding and processing of signals received from the endpoints 24, 25, and 26. The bridge 22 also performs summing, mixing, and other processing of signals, and sends signals to the endpoints 24, 25, and 26.

Additional types of endpoint devices may be utilized with the present invention. For example, any communication device, whether a cell phone; PDA; computer with microphone, speaker, and appropriate software; cordless phone; answering machine; or room conferencing system, etc. may be used as an endpoint device. The foregoing are illustrative examples of endpoint devices and are not intended to be exhaustive. It will be appreciated by one skilled in the art that additional types of communication devices are within the scope of the present invention. In addition, the endpoint devices may include various components. It should be noted that not all elements of the endpoints discussed herein are necessary in alternative embodiments. Likewise, additional elements may be included in alternative embodiments. In addition, additional devices may be coupled to or integrated with an endpoint, such as display screens, overhead projectors, cameras, printers, scanners, microphones, loudspeakers, computers, etc.

The endpoints 12 and 14 communicate via a network 16. Audio signals may be transmitted and received via the network 16. Video signals may also be transmitted and received via the network 16. Furthermore, data, including but not limited to, control signals, may be transmitted and received via network 16. In some embodiments, the network 16 may be the PSTN. In other embodiments, the network may be an IP-based network. Various communication protocols may be used for exchanging signals and data, including but not limited to control signals, between the endpoint 12 and the endpoint 14.

With reference to FIG. 2, control data may be sent from any endpoint 24, 25, or 26 to control another endpoint including the bridge 22. In addition, control data is bi-directional, and each endpoint 24, 25, and 26 including the bridge 22 can send and transmit control data. For instance, control data may be sent from the bridge 22 to control one or more of the endpoints 24, 25, and 26. Thus, control signals may be used to control or be controlled by another endpoint including the bridge 22.

In order to send digital data in addition to the normal audio or video signals over the existing audio or video channel, a data connection may be embedded within an existing audio or video connection. Utilizing this process to transmit data during audio or video conferencing, various types of data aside from the normal audio or video data can be exchanged by way of embedded digital signals.

For example, a participant in a multipoint call, using a multipoint bridge, may wish to manage and supervise that call. The participant can use the existing audio connection to carry additional supervisory information, allowing her to monitor and control the bridge operation for information such as number and identification of participants, current cost of conference, session identification, number of channels simultaneously enabled, and many other functions associated with bridge control. This channel also gives the supervisor, over the established channel, the ability to send data to the bridge, performing operations such as muting some or all other endpoints, disconnecting some or all other users, transferring supervisor status to another user, changing operating mode of the bridge, initiating a polling process, and numerous other functions. Additional various examples of control functions will be discussed below.

For example, control data may include instructions to adjust a far endpoint's volume. For example, a participant at one site (listening participant) may detect that another participant (speaking participant) is sending audio at an unusually low amplitude. Rather than interrupting the speaking participant and asking that he speak more loudly or closer to the microphone, or rather than increasing the listening participant's volume, the listening participant can send a command message from his endpoint through the existing audio channel to control the far endpoint by increasing its transmit gain to compensate.

As another example, the control signals may include instructions for the bridge to dial a specific phone number or connect to a specific IP address. In this manner, a conferee may be added to a conference call. Advantageously, by having the bridge call a participant instead of having the participant call the bridge, the participant need not remember any phone numbers, conference ID numbers, or passwords to join a conference.

As another example, the control signals may include instructions to mute some or all other endpoints. For example, in an audio conference among one hundred participants, one may be granted speaker status by the bridge, and all others can be automatically muted. The conference can then proceed in half-duplex mode rather than full-duplex mode. Advantageously, less bandwidth is required for half-duplex mode. In addition, when one participant is the primary speaker for a length of time, automatically muting all other participants' endpoints greatly simplifies the process of mixing and processing all of the endpoint audio signals. Furthermore, the other ninety-nine participants need not remember to mute their endpoints manually. This also advantageously avoids the possibility of some of the other ninety-nine participants' fumbling with their endpoint devices to find a mute button and accidentally hanging up.

A process may also be provided to selectively allow the muted participants to contribute to the conference. For example, another participant can ask a question by pressing a question button on his endpoint. His endpoint can send a message to the bridge indicating "Question requested." The bridge decodes the message, and sends a message to the speaker's endpoint indicating a question has been requested (e.g., "Question requested by User 71").

The speaker presses an "Accept question" button on her endpoint. A message is sent to the bridge, indicating that the question has been accepted. The bridge decodes this message, and forwards a message to the questioner (User 71). The questioner's endpoint decodes the message and displays "Please ask question now" on its LCD. The questioner's endpoint is unmuted, and the participants can hear his question.

In addition, the control signals may provide instructions that a far endpoint establish a new connection, such as an IP connection to a website.

In audio conferences, it is often desired to add additional content to the audio conference. This may be by adding a graphics connection to share a slide presentation, or by sending photographs, by adding a video connection, or by some other mode. This can be done by a variety of means, but most often involves a considerable degree of effort and delay, and results in considerable disruption of the meeting. The greatest part of this disruption is due, not to the actual exchange of the additional information, but to the effort required to establish the connection by which the additional material will be sent. This effort will often entail the comparison of additional telephone or fax numbers, IP addresses, passwords, session identification numbers, and a tedious repetition of same while all participants compare status information to figure out why the connection is not occurring.

For example, in an audio conference between two participants, one participant may have a slide presentation he wishes to show to the other participant from his computer. Participant A (PA) connects his computer's video port to a special port on his speakerphone. The speakerphone is designed such that it recognizes the presence of video at this special port, or on command as by a press of a button, as an instruction to establish an IP connection to the far end, and to then compress and send whatever video it sees at this special port. The video is sent over the IP connection, either as a separate channel on the existing IP connection or as a second communication link.

PA's speakerphone constructs the message "Meet me at www.polycom-calypso.com, using session identification ABCDEFGHIJ and password 12345678." PA's speakerphone encodes this message and embeds it in the ongoing audio signal.

Participant B's (PB) speakerphone, which has a complementary capability, detects this message and follows its instructions. PB's speakerphone uses an IP connection, either an additional channel or a second link, and goes to the stated website, enters the stated data, and begins receiving data which it recognizes as compressed video which it can reconstruct. PB's speakerphone reconstructs this received data, and displays it to PB using a connected display from this point through the rest of the meeting.

In the situation where each speakerphone is connected to a videoconferencing unit, such as by an HSSB link described below, the new connection can be a video link between the two videoconferencing units. Speakerphone A is linked to videoconferencing unit A and speakerphone B is linked to videoconferencing unit B. Participant A elects to migrate the conference between Participants A and B from audio only to video and audio. Participant A selects this function on speakerphone A. Speakerphone A retrieves the telephone number or IP address, or both, from videoconferencing unit A. This information is then transmitted to speakerphone B in a message that says "Have your video unit call mine at 123-456-7890." Speakerphone B receives the message and provides the request and number or numbers to videoconferencing unit B. Videoconferencing unit B then initiates the videoconference to complete the connection. This is an example of commands being transferred among various units in a chain to perform the desired operation.

Furthermore, the control signals may include instructions for a bridge to send billing information to one of the endpoints. Advantageously, an endpoint can request real-time billing reports and detailed records which may include various parameters in order to facilitate rapid endpoint billing.

In addition, a participant can receive cost-of-conference-so-far status information. For example, in an audio conference among several participants, one may wish to monitor the cumulative cost of the conference. The participants call into an agreed-upon audio bridge. One presses a "Supervisor" button on her telephone, followed by a password, PIN number, or other security information. The supervisor's endpoint assembles and sends a message containing the information "I am the supervisor, and this is my password." The bridge detects and decodes this message. The bridge now understands that this particular connection is the supervisor. The bridge begins sending messages to the supervisor, for example, periodically (e.g., every minute) or whenever a participant joins or leaves the conference, with the format "Cost so far $51.80." The supervisor's endpoint decodes these messages from the bridge, and displays the information on her endpoint's display.

An advantage of this technique lies in the fact that data is available continuously or for significant durations during a session, as opposed to momentary data packets such as DTMF messages. This makes possible continuous monitoring of call status, which enables such functions as keeping track of cumulative cost of a call.

In addition, an endpoint can provide payment information to the bridge. For example, an endpoint may provide a participant's credit card number or other payment instructions. Other payment methods may be used such as, for example, billing the call to each participant via his communication service provider, or using a credit account or pre-paid account of the participant at the conference service provider, etc.

The foregoing are illustrative examples of control functions wherein an endpoint including a bridge may control or be controlled by another endpoint including a bridge. The foregoing examples are illustrative only and are not intended to be exhaustive. It will be appreciated by one skilled in the art that additional types of control functions are within the scope of the present invention.

In one embodiment of the present invention, the network 16 of FIG. 1A (and/or any of the networks 27, 28, and 29 of FIG. 2) may be an IP-based network. The network may comprise a packet switched IP-based network such as a local area network (LAN) utilizing, for example, Ethernet technology, or a wide area network (WAN) such as the Internet. Devices communicating through an IP-based network employ an appropriate communication standard and an appropriate protocol such as Transmission Control Protocol/Internet Protocol (TCP/IP).

Any IP-based standard may be employed, whether now known or later developed. Examples of presently known IP-based standards include without limitation Real Time Transport Protocol (RTP), Real Time Streaming Protocol (RTSP), Session Initiation Protocol (SIP), H-Series (e.g., H.263, H.323, and H.324, etc.), T-Series (e.g., T.120, etc.), and G-Series (e.g., G.711 and G.722, etc.), among others.

Figure 3:
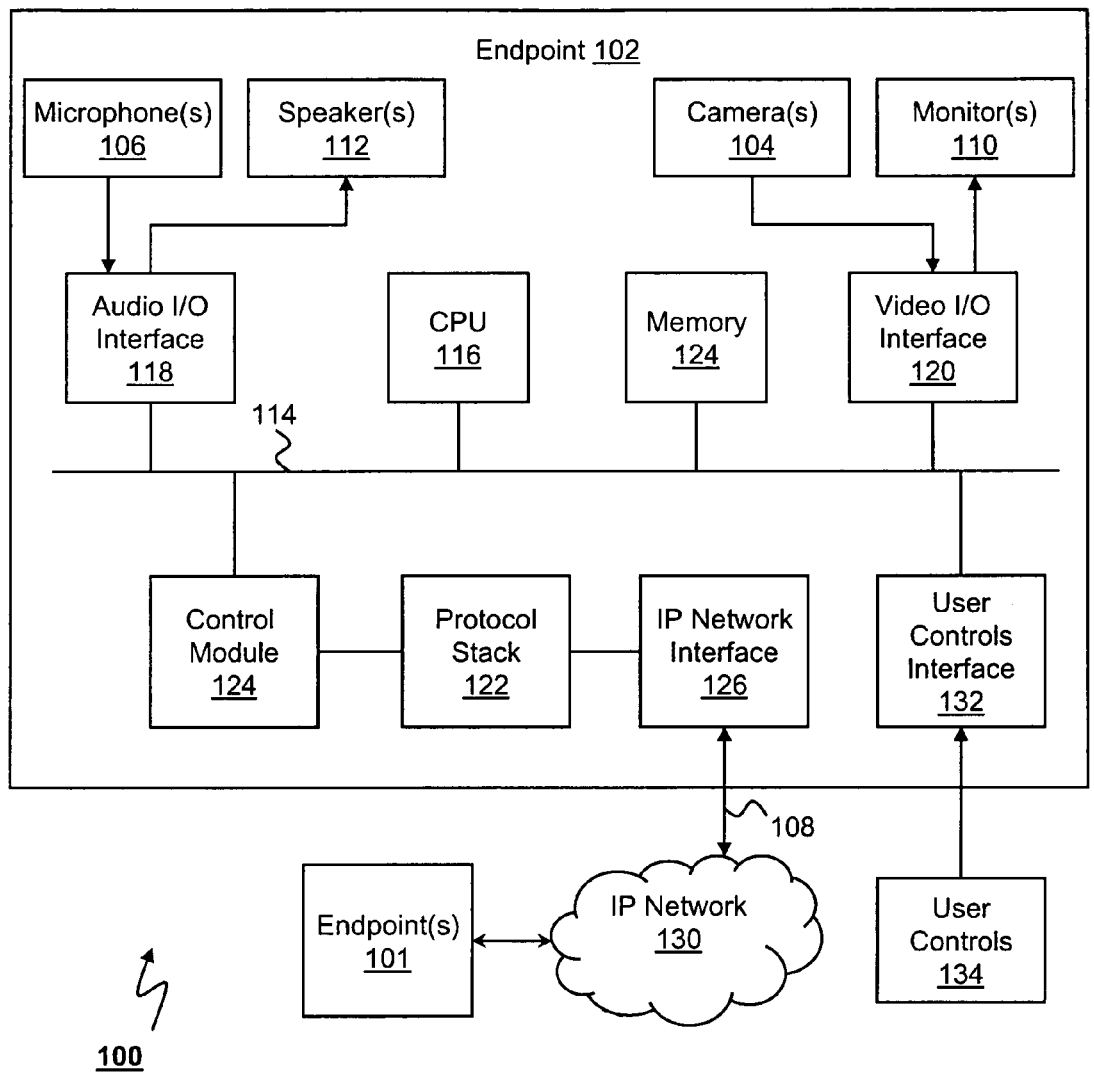
FIG. 3 depicts an exemplary block diagram of a conferencing system in accordance with one embodiment of the present invention wherein an IP-based communication protocol is utilized.

Reference is now made to FIG. 3, which depicts an exemplary conferencing system 100 employing an IP-based protocol in accordance with one embodiment of the present invention. One or more of the endpoints 12 and 14 of FIG. 1A or one or more of the endpoints 24, 25, and 26 of FIG. 2 may be embodied as the endpoint 102 shown in FIG. 3. Although the endpoint 102 is depicted and described as a video conferencing unit, it will be appreciated by those of skill in the art that the video capability is optional, and the endpoint 102 may alternatively be a device for audio conferencing without video conferencing capability.

The endpoint 102 receives input from and transmits output to a variety of peripheral devices, and additionally communicates with other devices, including one or more remote conference endpoints 101, via private or public IP networks. The endpoint 102 acquires video and audio information (typically representative of the images and voice of the near conferencing participants) respectively generated by one or more cameras 104 and one or more microphones 106. The endpoint 102 processes the acquired video and audio information, and transmits the processed information to the one or more remote conference endpoints 101 connected to the endpoint 102 via an IP link 108.

The endpoint 102 receives video and audio information (typically representative of the images and speech of the remote conference participants) from the remote conference endpoint. The received video and audio information is processed by the endpoint 102 and the processed video and audio information is directed to a video monitor 110 and speakers 112 so as to present to the near conference participants the images and speech of the remote conference participants. The endpoint 102 may also receive input from or direct output to other peripheral devices, such as a videocassette player/recorder, document camera or LCD projector.

The endpoint 102 comprises various components interconnected for communication by at least one bus 114. The components may comprise a central processing unit (CPU) 116. The CPU 116 interprets and executes program instructions loaded from a memory 124. The memory 124, which may variously include volatile RAM, non-volatile ROM, and/or storage devices such as magnetic disk drives or CD-ROMS, stores executable programs, data files, and other information.

The components may further comprise an audio input/output interface 118 coupled to one or more microphones 106 and one or more speakers 112. The audio input/output interface 118 performs analog-to-digital and digital-to-analog conversion and performs other signal processing tasks in connection with audio information received from one or more microphones 106 or sent to one or more speakers 112. The one or more microphones 106 may be internal to the endpoint 102, or external to the endpoint 102, or a combination. Likewise, the one or more speakers 112 may be internal to the endpoint 102, or external to the endpoint 102, or a combination.

The components may optionally comprise a video input/output interface 120 coupled to one or more cameras 104 and one or more monitors 110. The video input/output interface converts and processes video information received from one or more cameras 104 and sent to one or more video monitors 110. The one or more cameras 104 may be internal to the endpoint 102, or external to the endpoint 102, or a combination. Likewise, the one or more monitors 110 may be internal to the endpoint 102, or external to the endpoint 102, or a combination.

An IP network interface 126 enables connection of the endpoint 102 to an IP network 130. The IP interface 126 relays signals to and from a protocol stack 122. The protocol stack 122 establishes Internet voice and protocol video conferencing sessions. Data received from the IP network 130 is passed to a control module 124. The control module 124 detects whether control data is embedded in the audio or video. The control module 124 may decode the control data, or alternatively forward the control data without decoding it.

In accordance with the present invention, the control module 124 enables users to manage calls and control functions of the remote endpoint(s) 101. Furthermore, the endpoint 102 may be controlled by the remote endpoint 101. Supervisory control of conferencing is also handled by the control module 124, which provides control data to conferencing parties in order to modify conferencing parameters. These parameters may include directing the type and manner of audio and/or video display, caller intervention, secure access and retrieval of data, and a variety of other functions. The endpoint 102 may provide a digital control channel and a voice channel over the same link to the IP network 130. On a receiving end, the control data may be sent to a control module of the receiving endpoint 101 where the parameters may then be altered.

Thus, in accordance with the present invention, functions of the endpoint 102 can be controlled by one or more of the endpoints 101. Furthermore, the endpoint 102 can control functions of one or more of the endpoints 101. Control signals may be sent between the endpoint 102 and the one or more endpoints 101 via the same communication channel as the audio (and video) signals. As described above, control signals may also be used to control or be controlled by a bridge.

In addition, user controls interface 132 enables entry of user input from a local conference participant by receiving and processing signals received from user controls 134. User controls 134 may include a wireless remote control device having a set of keys engageable by the user. The keys may include, for example, numeric keys, directional arrows, volume and camera position adjustment keys, a menu key, and a slideshow key for initiating transmission of slideshow images to the remote conference endpoint 101. Engagement of keys causes a corresponding infrared or radio frequency code to be sent to user controls interface 132. User controls interface 132 is thus operative to receive and interpret the codes for further processing by other components of the endpoint 102. Entry of user input, such as telephone numbers or configuration information, may be advantageously accomplished through use of a graphical user interface (GUI), displayed on the one or more monitors 110, which prompts the user for specified information.

In another embodiment, communications may be exchanged according to a modem data protocol. For example, a V.xx standard, H.324 standard, or a Bell 212 protocol may be utilized. The V Series are ITU (International Telecommunication Union) standards for data communication over the telephone network. Prior to the ITU standards, the American Telephone and Telegraph Company and the Bell System offered its own standards (e.g., Bell 103 and Bell 212A). V.22 is an ITU standard for 1200 bps (bits per second) duplex modem standardized for use in the general switched telephone network and on point-to-point 2-wire leased telephone-type circuits. V.22bis is an ITU standard for 2400 bits per second duplex modem using the frequency division technique standardized for use on the general switched telephone network and on point-to-point 2-wire leased telephone-type circuits. V.32 is an ITU standard for a family of 2-wire, duplex modems operating at data signaling rates of up to 9600 bps for use on the general switched telephone network and on leased telephone-type circuits. V.32bis is an ITU standard for a duplex modem operating at data signaling rates of up to 14,400 bps (bits per second) for use on the general switched telephone network and on leased point-to-point 2-wire telephone-type circuits. V.34 is an ITU standard protocol for modems operating at data signaling rates of up to 33,600 bps for use on the general switched telephone network and on leased point-to-point 2-wire telephone-type circuits. V.61 is an ITU standard for a simultaneous voice plus data modem, operating at a voice plus data signaling rate of 4800 bps, with optional automatic switching to data-only signaling rates of up to 14 400 bps, for use on the general switched telephone network and on leased point-to-point 2-wire telephone type circuits. V.70 is an ITU standard for the simultaneous transmission of data and digitally encoded voice signals over the GSTN, or over 2-wire leased point-to-point telephone type circuits. V.90 is an ITU standard for a digital modem and analog modem pair for use on the PSTN at data signaling rates of up to 56,000 bps downstream and up to 33,600 bps upstream. V.xx modems automatically adjust their transmission speeds based on the quality of the lines. H.324 is an ITU standard for for low bit-rate multimedia communication terminals using V.34 modems and V.8 procedures to start or stop data transmission over the GSTNs. H.324 provides capabilities to commence a voice call and add a video channel. Additionally, H.324 provides for an optional data channel. These additional channels are developed using protocols according to H.324. Thus H.324 is an example of modem transferring audio and data over separate channels. Additional information regarding ITU standards can be found at the ITU's website at http://www.itu.int.

Figure 4:
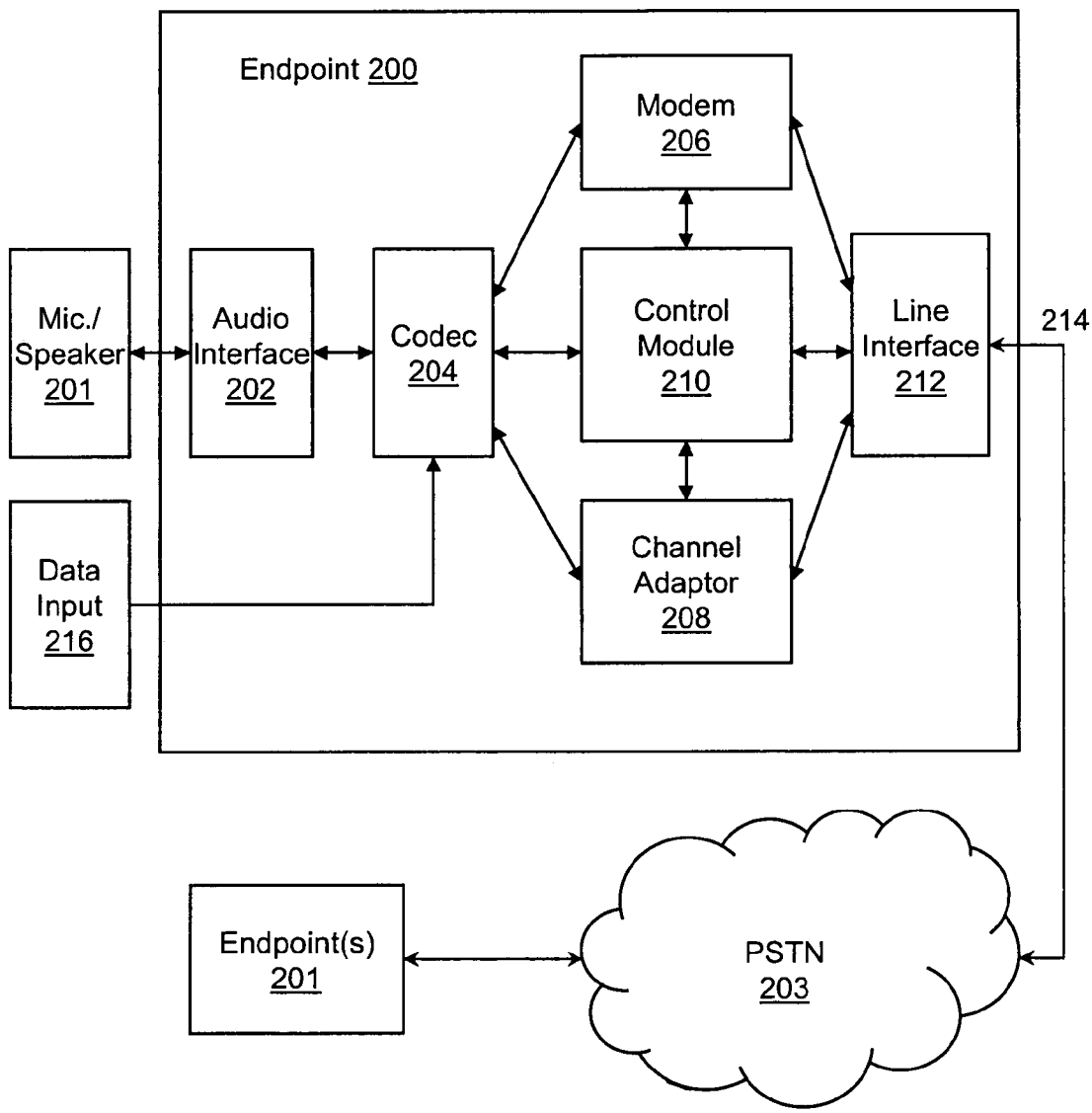
FIG. 4 depicts an exemplary block diagram of a conferencing system in accordance with another embodiment of the present invention wherein a modem communication protocol is utilized.

An exemplary audio conferencing system employing a modem data protocol based protocol in accordance with one embodiment of the present invention is shown in FIG. 4. The system comprises at least two endpoints 200 and 201 communicating via a network 203 such as the PSTN pursuant to a modem data protocol.

An audio input/output interface 202 can receive audio data from a source such as one or more microphones 201. The audio input/output interface 202 can also perform audio data output functions, such as forwarding audio signals to one or more speakers 201.

Audio from at least one microphone is forwarded to a codec 204 via audio input/output component 202 for compression of the audio data. Preferably, the codec 204 can be operated at different bandwidths as well as at different data rates. In other words, the codec 204 is a codec designed such that for a constant level of quality, a required data rate will be reduced as the bandwidth is reduced. In order to create the codec 204, for example, a constant algorithm can be employed with the coding parameters of the algorithm adjusted to achieve the reduction in bandwidth according to the reduction in data rate. Alternatively, various codecs 204 may be selected depending upon the data rate available, a fixed narrow bandwidth codec 204 can be combined with a variable bandwidth codec 204, etc. However, any codec 204 is within the scope of the invention.

The compressed audio data may be forwarded to a modem 206. The modem 206 converts the audio data into an analog signal for transmission via a POTS audio connection 214, or a cable audio connection 214, etc. The modem 206 can establish the frequency at which the data will be transmitted via the audio connection 214. The modem 206 forwards the audio signals to a POTS interface 212, which sends the audio signals to the one or more remote endpoints 201 via the audio connection 214.

A channel adaptor 208 may convert the digital data into a format acceptable for transmission via a data channel. However, the compressed audio data forwarded to the channel adaptor 208 is not converted into an analog signal. Rather, the audio data forwarded to the channel adaptor 208 is transmitted in digital form via a digital transmission medium.

In accordance with one embodiment of the present invention, a control module 210 is provided to enable users to manage calls and control conference functions. Supervisory control of conferencing is handled by the control module 210, which provides control data to conferencing parties in order to modify conferencing parameters. These parameters may include directing the type and manner of audio and/or video display, caller intervention, secure access and retrieval of data, and a variety of other functions. The modem 206 receives both the audio and control data signals, and forwards the signals to the line interface 214 for transmission over the PSTN 203. Thus, the endpoint 200 may provide a digital control channel and a voice channel over a modem link to the PSTN 203. On a receiving end, the control data may be sent to a control module of the receiving communications device where the parameters may then be altered.

In accordance with certain embodiments of the present invention, a serial I/O protocol may be used such as USB (Universal Serial Bus) or IEEE1394, etc. In addition, a High-Speed Serial Bus ("HSSB") or other proprietary link may be used to implement a conference link between or among conference devices, such as a video conferencing unit, a speakerphone, a microphone pod, or a loudspeaker, for example. The conference devices may be located in the same conference room. With HSSB, all data in a conference may be transmitted among linked devices. With HSSB, data and processing power become commodities within the system and can be shared among the linked devices. Adding new devices, such as a speakerphone or a video conference device, can add new capacity to the whole linked system, not just within the new device. The capability of the system can be increased incrementally. With HSSB, most functions may be advantageously distributed and reallocated to any desired device. The control of any devices within the linked system can be shared among the linked devices, i.e., from one of the linked devices, one may control the operation of all devices within the linked system.

Figure 5A:
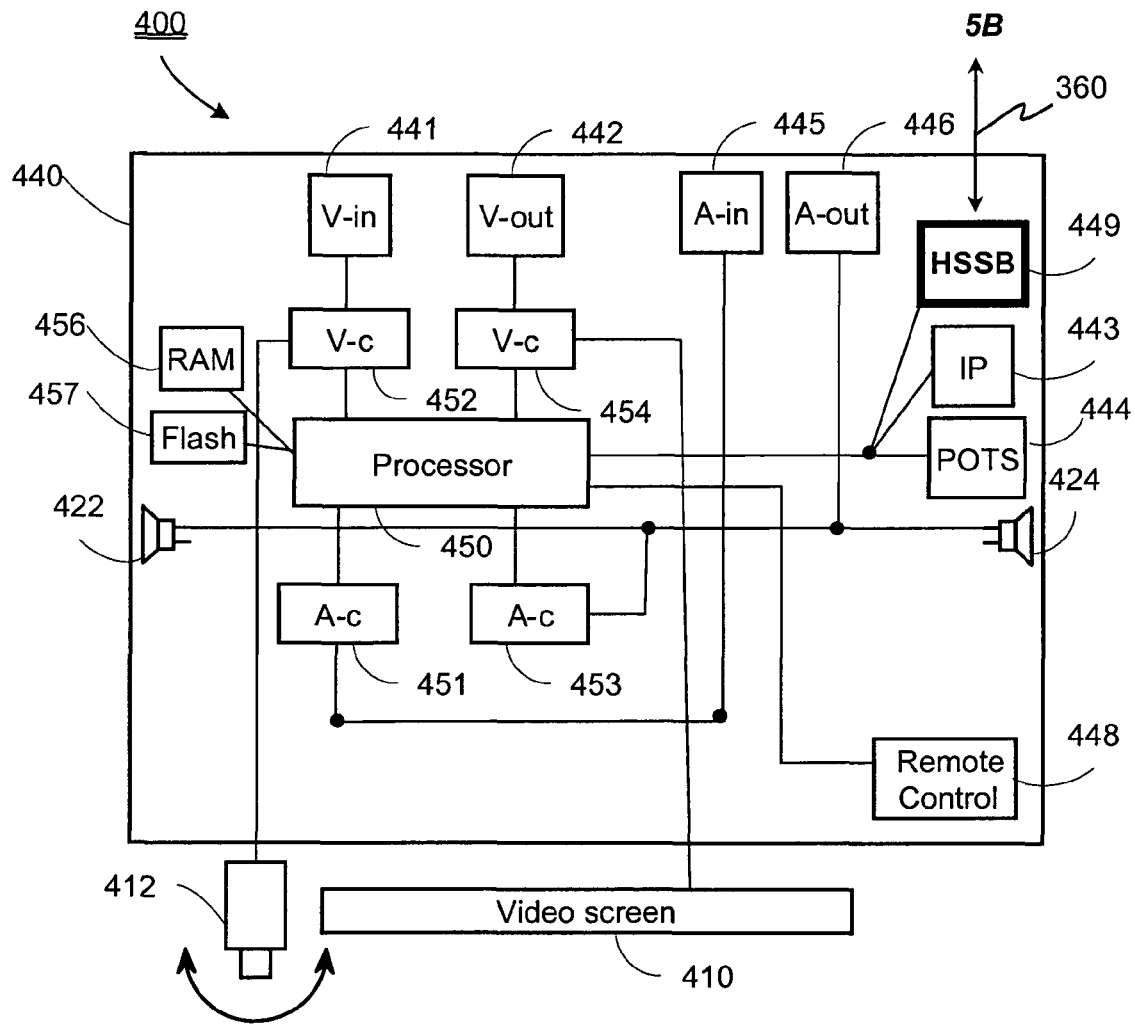
FIGS. 5A and 5B depict an exemplary block diagram of a conferencing system in accordance with another embodiment of the present invention wherein a serial I/O protocol is utilized.
Figure 5B:
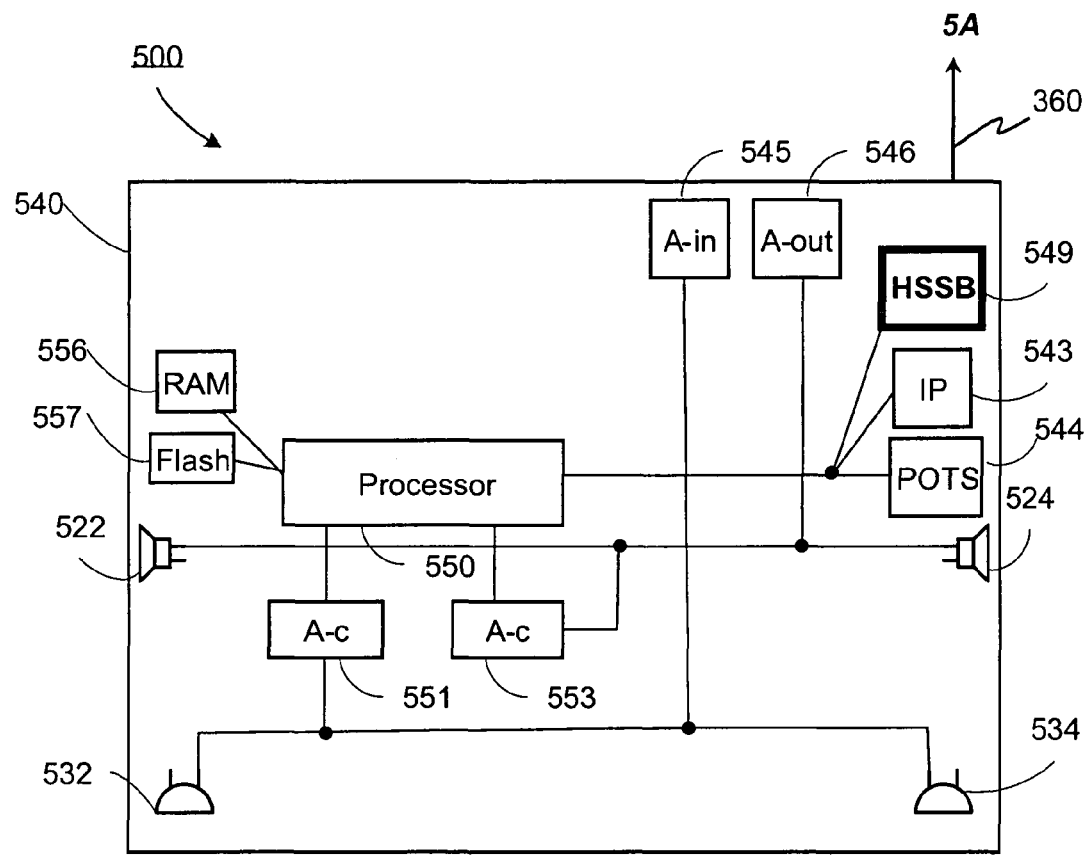

An exemplary conferencing system utilizing a HSSB-based protocol in accordance with one embodiment of the present invention is shown in FIGS. 5A and 5B. FIG. 5A depicts a block diagram of an exemplary video conference unit 400, and FIG. 5B depicts a block diagram of an exemplary speakerphone 500 that is linked to the video conference unit 400.

The video conference unit 400 comprises a central module 440, which may include loudspeakers 422 and 424, a connection to a camera 412, and a connection to a display screen 410. The central module 440 may comprise hardware, software, firmware, and any combination thereof. The central module 440 may include various interfaces for additional video and audio components: video input interface 441, video output interface 442, audio input interface 445, and audio output interface 446. Each interface has connections to multiple audio or video channels.

The signal processing and control is performed by a processor unit 450, which is coupled to various audio/video components or interfaces through intermediates 451, 452, 453, and 454. Those intermediates 451-454 perform signal conversions, such as digital-to-analog conversions and analog-to-digital conversions, etc. While they are shown as separate blocks, they could be integrated into a single module or an integrated chip. The processor unit 450 is supported by a memory module 456 (typically RAM) and a mass storage 457 (typically flash memory). Signal processing programs may be stored in the mass storage 457. Component profiles, which may be used in certain situations, can be stored there as well.

The central module 440 may comprise a number of different network interfaces, such as an interface 443 for a digital network, an HSSB interface 449 which will be described in more detail below, and an interface 444 for an analog network, typically for connecting with POTS lines. The interface 444 may comprise a POTS line for each audio channel when a stereo conference is used. The digital interface 443 may support various digital connections, such as ISDN, Ethernet, or USB, etc. The ISDN connection may be used for a video conference connection through an ISDN network. The Ethernet or LAN connection may be used for video conferencing through the Internet or over a LAN. The USB connection may be used to exchange an additional audio/video media stream, such as additional cameras, microphones, computers with additional documents, etc.

A remote control interface 448 may further be provided. The remote control interface 448 can receive control commands from a handheld remote control (not shown) and transmit the commands to the central module 440 to control the operation of the video conference unit 400. The HSSB interface 449 is a special interface for a conference link, according to an embodiment of the present invention. The HSSB interface 449 uses the HSSB protocol for transmitting/receiving audio data and control data.

A block diagram of a speakerphone 500 according to an embodiment of the present invention is shown in FIG. 5B. The speakerphone 500 may comprise a central module 540, including microphones 532 and 534, loudspeakers 522 and 524, signal converters 551 and 553, audio input interface 545, audio output interface 546, an HSSB interface 549, a digital network interface 543, an analog network interface 544, a memory module 556, a mass storage module 557, and a processor 550. The central module 540 may comprise hardware, software, firmware, and any combination thereof.

According to an embodiment of the current invention, the video conferencing unit 400 is connected to speakerphone 500 through a conference link 360. The conference link 360 connects the video conference unit 400 and the speakerphone 500 through the HSSB interfaces 449 and 549, respectively. The link 360 can be implemented and used in various different ways.

Analog Link

In one implementation, the link 360 is an analog audio link which connects analog microphone signals and loudspeaker signals between the video conferencing unit 400 and the speakerphone 400. With this link 360, the microphones in the speakerphone 500 pick up sounds (e.g., voices) from conference participants and supply such microphone signals to the video conferencing unit 400 for further processing. At the same time, the loudspeakers in the speakerphone 500 reproduce voices from the far end. This way, the external microphones and loudspeakers for the video conference unit 400 may be eliminated from the conference room. The audio processing then can be performed by the audio processor in the speakerphone 500. The audio processing of the speakerphone 500 may have various audio features such as full-duplex audio, noise reduction, acoustic echo cancellation, and even stereo audio pickup and reproduction. In this embodiment, the link 360 between the video conference unit 400 and the speakerphone 500 can be, for example, a three-wire cable, as used in cell phone headsets or stereo earphones. The three-wire cable includes a wire for a loudspeaker signal, a wire for a microphone signal, and a wire for common ground.

Digital Link

Alternatively, the link 360 may be a digital link between the video conference unit 400 and the speakerphone 500. The digital link may be referred to a HSSB or a Conference Link. In this embodiment, a digital cable 360 couples the video conference unit 400 and the speakerphone 500 through the HSSB interfaces 449 and 549, respectively.

When a digital connection is used, various data packets can be transmitted between the video unit 400 and the speakerphone 500. These data may include multiple channels of digitized audio data between the two units, as well as control data.

Physical Layer of HSSB

According to one embodiment of the present invention, the digital link 360 couples the video conference unit 400 and the speakerphone 500 through the HSSB interfaces 449 and 549, respectively. There are two dedicated bidirectional buses in the HSSB: a data bus and a clock bus. The HSSB interface may send or receive in either direction. The physical layer of the link 360 preferably uses LVDS (Low Voltage Differential Signaling). LVDS is one of the many signaling standards capable of supporting high speed communication at low power consumption. In one embodiment, the HSSB is physically similar to an Ethernet connection, using Category 5 type of cable for the connection, i.e., a cable with unshielded four pairs of twisted copper wires. But the HSSB interface uses its own link protocol for transmitting data.

At power on, each device detects the presence of a clock on one of the device link connections. This enables the device to determine which port is "upstream" or "downstream" and also determines which port requires a clock drive. Since the power for the linked devices is supplied by the link 360, periodic determination of the downstream port is not required. In the case of linked devices that do not have an independent clock source on board, the logic can be driven by the link clock after the source is determined. Source determination can be accomplished by having two counters that are reset during power on and are clocked by their respective ports. Once a counter has reached a certain count, the respective port is declared as the clock source. The other counter is disabled. The rest of the logic is brought out of reset, and the clock source is supplied to the rest of the logic. Which counter reaches the required count is also used to determine which device is the upstream device or the downstream device. Other methods may also be used to determine the clock source, for example, based on the device IDs, or by the time when the conference software or HSSB software is installed. The clock source may determine the master/slave devices. The master is typically the one that provides clock data.

In one implementation, the total data rate is 36.768 Mbps, divided into frames of 32 kHz or 48 kHz. These can be partitioned, for example, to provide 46 audio channels (16-bit audio at 48 ksps for >20 kHz bandwidth) in an audio-only system, all two-megabit H.263 or H.264 video channels, 36 Mbps of raw high-availability data bandwidth, or any other desired allocation. Teleconference devices can both send and receive data. All data transmission is fully time-scheduled. This way, there is no packet collision, backoff or resend, which reduces the effective bandwidth. This assures no lost packets and extremely low latency. The effective bandwidth of HSSB is comparable to the 100BaseT networks. The conference link 360 can also support daisy-chaining (connection in series), which minimizes cabling while maximizing coverage. The system may also be installed in parallel, depending on the conference room configuration. The HSSB links may be a combination of connections in series or in parallel.

In accordance with one embodiment of the present invention, this high data bandwidth is especially valuable because it allows the exchange of more than just audio signals. Indeed, video signals, control data, and intermediate data streams can be exchanged. Therefore, significant processing resources can be distributed through the system, not just in a set-top or a room processing module. This is, in effect, a mesh computing network: an immensely flexible system architecture because processing can be scaled to match customer requirements, and a basic system does not need to be expensively over-designed to protect against possible future needs. Additional functions and additional processing can be added, when and where needed, as requirements develop. Many functions, resources or controls may be distributed among the linked devices, as discussed below.

The data transmitted between the units are in data packets. Each packet may include several 16-bit words, typically two to eight words. Each word may represent the digitized data for one audio channel, one control command or one response. The transmitting and receiving packet rates are equal. In one embodiment, the digital link 360 is implemented in a master/slave protocol, for example, the video unit is a master, and the speakerphone is a slave. The communication between them is asymmetric.

Communication Protocol

As an example, the following packet format may be implemented.

The transmit packet format may be as follows:

| | |
|---|---|
| Bit 0 | Start |
| Bit 1–2 | Packet Type |
| Bit 3–5 | Address |
| Bit 6–10 | Transmit payload length (16 bit words) |
| Bit 11–15 | Receive payload length (16 bit words) |
| Bit 16–N | Payload |
| Bit N + 1 | Stop Bit |

The packet type may be:

| | |
|---|---|
| Type 0 | Set Address |
| Type 1 | Link Device Detect |
| Type 2 | Normal transaction |
| Type 3 | Global Command |

The payload length field can be zero indicating that no response is required/expected. Maximum payload length is 31 words which represents approximately 65% of the total available bandwidth.

Packet type 0 is sent periodically to allow the slave devices to set their address. No response is expected for this transmission type. As each link unit receives this field in increments the value by one before sending it upstream. For example, the first unit in the link will receive address 0 and send address 1, etc. The received address corresponds to the unit's link address. For the set address packet the address field is sent in bit reversed order to allow for a single bit latency for shipping data upstream. The LSB of the address (first address bit received) will always be inverted. If this bit were a one, a carry flag will be set and used to invert the next bit. This procedure is continued for all three address bits.

The set address packets are sent periodically when not in a call to allow for customer hot plugging of devices.

Packet type 1 is used to query the devices to determine what device types are present. The response to this transmission would be a packet with a single 16 bit payload that describes the device type, revision level, etc. These packets would also need to be sent periodically to allow for hot plug scenarios where the customer adds another device to the chain. A packet of type 1 will need to be sent to each possible address. A no-response indication can be used to determine if a slave device is at the address.

Packet type 2 indicates that a normal data packet transaction is required.

Packet type 3 is reserved for global commands to all devices on the link. No response is required for this packet type.

In the transmit/receive packet scheme, the receive packet format is determined by the transmit packet type. The receive packet is predominately payload. Only the start message preamble and a stop bit are required in addition to the payload.

Receive packet format:

| | |
|---|---|
| Bit 0–1 | Start bits |
| Bit 2 | Alignment bit |
| Bit 3–N | Payload |
| Bit N + 1 | Stop bit |

Within the HSSB interface, there may be a buffer area for outbound data and a buffer area for inbound data. For example, a 512 Byte SRAM location may be partitioned as two 256 Byte buffers. Since the maximum number of bytes transferable during a 48 KHz time period is 96 bytes, only the first 96 bytes of each buffer would need to be read/updated.

The downstream packet does not contain payload lengths, packet type, etc. This information will be auto-inserted into the receive header. The hardware will also insert a zero word at the end of the receive message list. The message length (number of 16 bit words) will be 1+ payload length. The transmit payload length field would be used to determine transmit message length, the receive payload length will be used to determine the receive payload length. If a response time out is encountered, the MSB of the receive header will be set.

Payload Data Packet

In one embodiment, the speakerphone, the slave device, can receive packets with two words, one for audio data and one for control data. The video unit may send packets with up to three words, with two audio words for two audio channels and one control word.

The 16-bit control word RCW15-RCW0 has two reserved bits RCW15-14, six message type bits RCW13-8 and eight control data bits RCW7-0.

Some sample of message types are illustrated in the Table 1 below:

TABLE 1

| $RCW_{13} \ldots RCW_8$ Value | Message Type |
|---|---|
| 0x00 | No data/No operation |
| 0x01 | Command data |
| 0x02 | Sync data |
| 0x03 | Reserved for future use |
| . | |
| . | |
| . | |
| 0x07 | |
| 0x08 | LCD control data |
| 0x09 | Reserved for future use |
| 0x0A | Automatic dialing data |
| 0x0B | Reserved for future use |
| . | |
| . | |
| . | |
| 0x0F | |
| 0x10 | "Write" register data. Bits $RCW_{11} \ldots RCW_8$ give the register index. |
| . | |
| . | |
| 0x1F | |
| 0x20 | LCD display data. Bits $RCW_{12} \ldots RCW_8$ provide the x-axis index for the display position. |
| . | |
| . | |
| . | |
| 0x3F | |

Some sample control data are illustrated in Table 2 below:

TABLE 2

| Message Type | $RCW_7 \ldots RCW_0$ Usage |
|---|---|
| Command Data | Command byte |
| Sync Data | Sync pattern (e.g. 0x5A) |
| LCD Control Data | LCD control byte |
| Automatic Dialing Data | ASCII byte (NULL-terminated string sent bytewise) |
| "Write" Register Data | Byte value to write to register |
| Display Data | 1 character or 8 pixels |

The packets from speakerphone to video unit contain the same type of words, except that there are more audio data words. There are up to eight 16-bit words in a packet sent from a speakerphone to a video unit using the conference link 360. The aux, audio and control words are similar to the words in a packet sent from a video unit to a speakerphone. The other six audio data words are used when the speakerphone or the combined system uses additional audio channels. If not, these audio data words may be used for generic data communication, e.g. video data video processing.

Audio Data Processing

Figure 19:
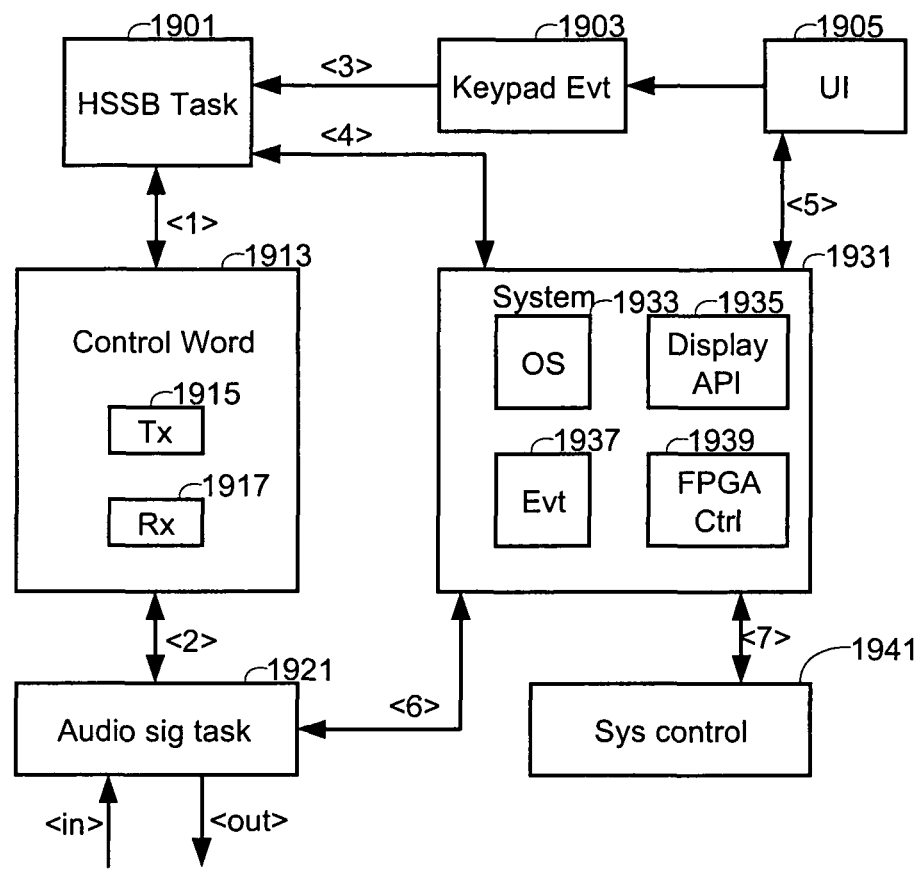
FIG. 19 depicts an exemplary flow diagram of processing HSSB (High Speed Serial Bus) data packets.

FIG. 19 depicts a flow diagram of how the data packets are processed. There are several major blocks: HSSB Task 1901, Keypad Evt 1903, UI 1905, Control Word 1913, System 1931, Audio sig task 1921, and Sys Control 1941.

The Audio Sig task 1921 reads input packets and writes output packets, which together form the physical interface, e.g. HSSB interface 549 as shown in FIG. 5B, for HSSB payload content coming from or going to the system. The Audio Sig task 1921 may have two buffers, one for input packets and one for output packets. All software-controlled HSSB audio content is consumed or produced locally in the Audio Sig (or Audio LEC) task 1921, but HSSB control words are produced and consumed in the HSSB task 1901, and are communicated between the two tasks via the Control Word Queues 1913.

Input HSSB payloads are read by the Audio Sig task 1921. The received control word is placed in the queue, and later processed by the HSSB task 1901, possibly with the involvement of other software components. Control data messages follow the communication pathways shown in the following Table 3.

TABLE 3

Input packet processing

| Rx Control Data Type | Communication Sequence |
|---|---|
| Command Data | 2, 1, 4 |
| Sync Data | 2, 1, |
| LCD Control Data | 2, 1, 4 |
| Automatic Dialing Data | 2, 1, 4 |
| "Write" Register Data | 2, 1, 4 |
| Display Data | 2, 1, 4 |
| Link Detect | 4 (no HSSB message) |

Outgoing control words are constructed by the HSSB task 1901 and placed in the queue. From there, they are added to the outgoing HSSB payloads when the Audio Sig task 1921 writes. On their way out, the various control data messages follow the processing pathways (from FIG. 15) given in Table 4 below:

TABLE 4

Output packet

| Tx Control Data Type | Communication Sequence |
|---|---|
| Command Ack | 1, 2 |
| Sync Data | 1, 2 |
| Caller ID Data | 7, 4 1, 2 |
| Keypad Data | 5, 3, 1, 2 |
| Call Status | 7, 4 1, 2 |
| Software Version | 1, 2 |
| Hardware Version | 4, 1, 2 |
| LCD Control Ack | 1, 2 |
| Mic Calibration Data | 4, 1, 2 |
| Automatic Dialing Data | 4, 1, 2 |
| Video Call Request | 5, 4, 1, 2 |
| Manual Dialing Data | 5, 3, 1, 2 |
| Local Phone Number | 4, 1, 2 |
| "Read" Register Data | 4, 1, 2 |

Thus, in addition to carrying audio data between linked conferencing devices, the HSSB may carry control and status data in accordance with the present invention. When the video conference unit 400 and the speakerphone 500 are connected with HSSB 360, control and status data may be transmitted between the connected devices. The dialing and other conference control may be made from the dial-pad on the speakerphone 500. The dial-pad command is sent to the video conference unit 400 embedded in the control word in the data packet from the speakerphone 500 to the video conference unit 400. The status data, including video conference status is returned to the speakerphone 500 in a similar control word in a return data packet. The conference status may be displayed on an LCD display on the speakerphone 500. The dial-pad on the speakerphone 500 may be used to control both the video conference unit 400 and the speakerphone 500. This way, the remote control for the video conference unit 400 is not needed when setting up a video conference call.

Figure 6A:
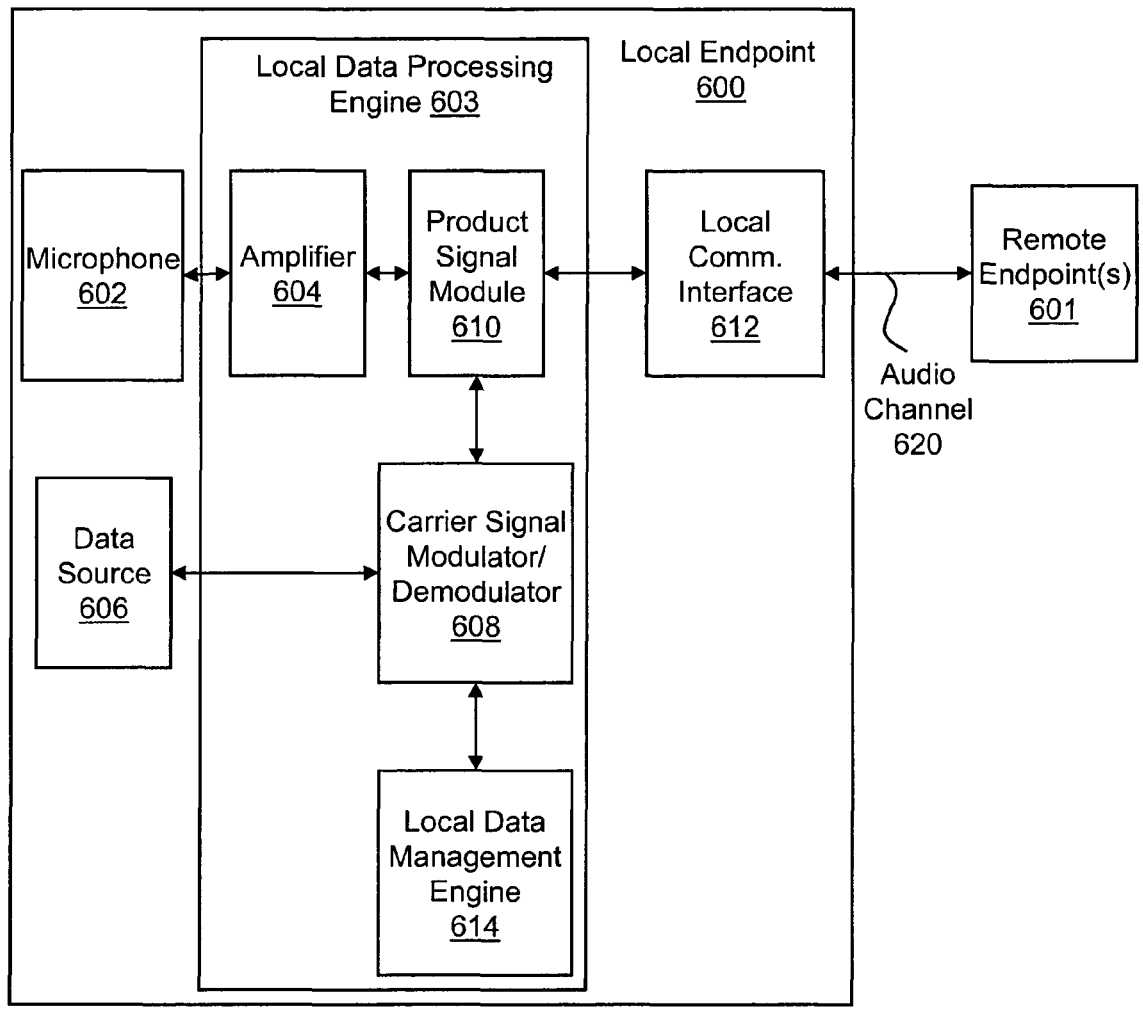
FIGS. 6A, 6B, and 6C depict an exemplary block diagram of a conferencing system in accordance with yet another embodiment of the present invention wherein a LPSP communication protocol is utilized.
Figure 6B:
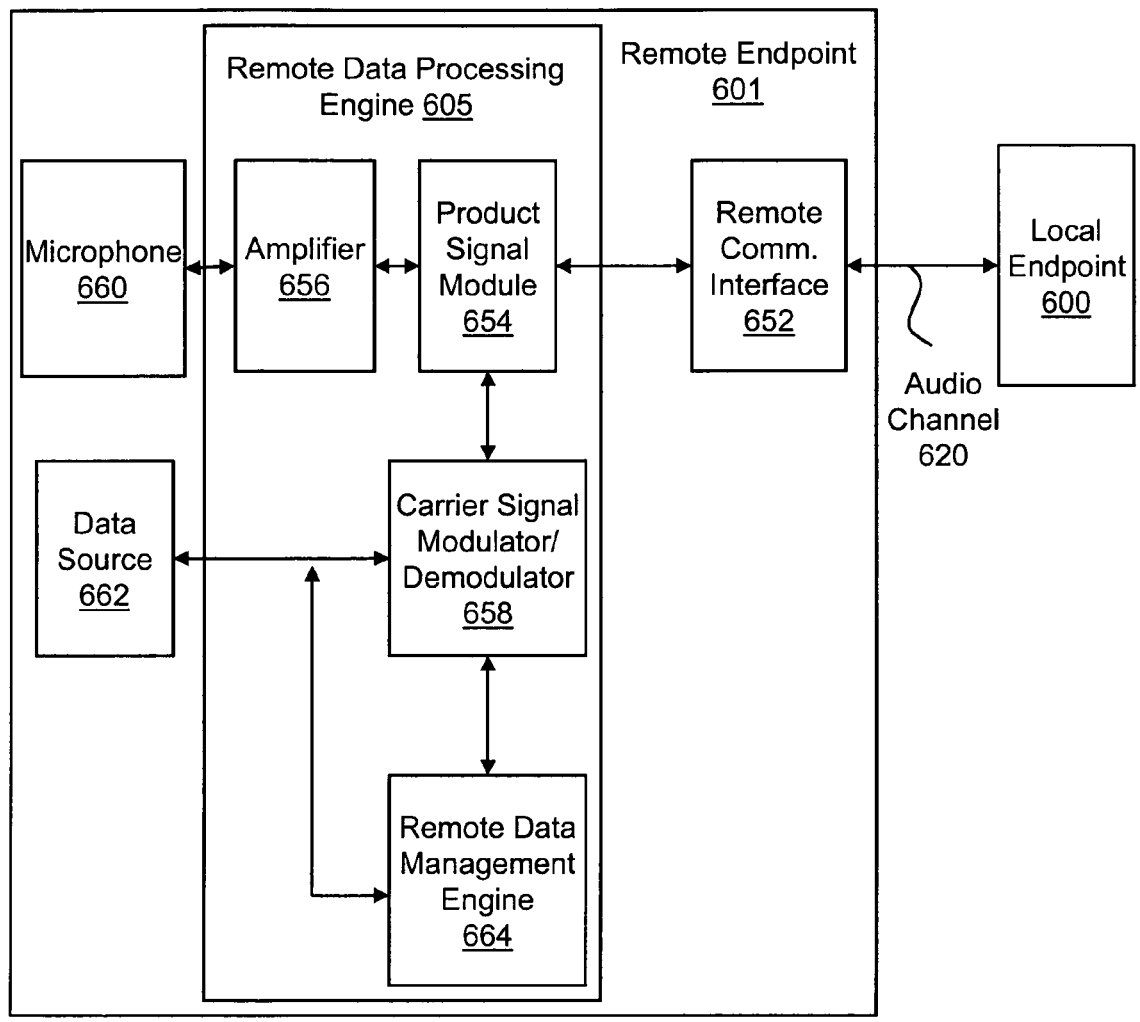

In accordance with another embodiment of the present invention, signals including audio signals and control signals may be exchanged according to a Low Profile Signaling Protocol ("LPSP"). An exemplary conferencing system in accordance with a LPSP-based protocol is shown in FIGS. 6A and 6B. The diagrams of FIGS. 6A and 6B illustrate an exemplary architecture for providing digital data over an existing audio channel 620 via in-band signaling, in accordance with an embodiment of the present invention.

The endpoint 12 of FIG. 1 may be embodied as the local endpoint 600 of FIG. 6A, and the endpoint 14 of FIG. 1A may be embodied as the remote endpoint 601 of FIG. 6B. Any of the endpoints 24, 25, and 26 of FIG. 2 may be embodied as the local endpoint 600 or the remote endpoint 601 of FIGS. 6A and 6B.

The local endpoint 600 exchanges audio signals with a remote endpoint 601 via the audio channel 620, which may be a POTS line, or a cable line, etc. In order to send digital data in addition to the conventional audio signals over the same audio channel 620, a low data-rate data "connection" is embedded within an existing narrow-band connection. Utilizing this process to transmit data during audio communication, various types of data aside from the conventional audio data can be exchanged by way of embedded digital data. For example, conference related data, such as spreadsheets, slide presentations, or diagrams, etc., can be exchanged between the local endpoint 600 and the remote endpoint 601 to enable collaborative conferencing.

As a more specific example, output from medical devices or any other devices can be sent to an expert during a phone call by persons attending to the medical devices. By this feature, the expert can receive pertinent data while on the phone call in which the expert may be providing instructions to persons located in proximity to the medical devices based on the data being received by the expert. Numerous applications of the process of transmitting data during audio communication using embedded digital signals are possible. Further, utilizing the system described herein to send data over the audio channel 620 avoids interruptions to the phone call. Thus, users experience no noticeable call noise or interruption as a result of sending digital data over the audio channel 620.

As another example, the digital data being transmitted to the remote endpoint 601 may be of an image from a whiteboard. Thus, as the local endpoint 600 transmits audio signals to the remote endpoint 601, digital data is also transmitted over the audio channel 620. The digital data includes images from the whiteboard at the site of the local endpoint 600, thus allowing the remote endpoint 601 to reproduce the images on a display medium associated with the remote endpoint 601.

The data from the whiteboard can be communicated to the local endpoint 600 via any type of connection suitable for use with the present invention, such as via a 232 link. The local endpoint 600 receives the data from the whiteboard and the local data processing engine 603 packages the data for transmission via the audio channel 620.

Any device may be coupled to the local endpoint 600 for providing data to the local endpoint 600, receiving data from the local endpoint 600, etc. in accordance with the present invention. For example, a computing device, such as a personal computer, may optionally be associated with and/or coupled to the remote endpoint 104. The computing device can process and play the audio data from the audio signals. Further, in the present example, the computing device can utilize a projector to display the digital data received from the whiteboard onto the display medium, such as a whiteboard, screen, etc. associated with the remote endpoint 601. Alternatively, the images from the whiteboard received via the digital data transmitted during the audio communication may be displayed on a display medium of the computing device itself.

Conversely, the projector may utilize the audio channel 620 to forward digital data back to the local endpoint 600. For example, the projector, via the computing device and the remote endpoint 601 can forward digital data to the local endpoint 600 during audio communication indicating that a packet was not received. Alternatively, other devices may be coupled to the local endpoint 600 and the remote endpoint 601 for providing and displaying various types of digital data transmitted via the audio channel 620.

Furthermore, control signal data may be sent between the local endpoint 600 and the remote endpoint 601. The control signals may include, for example, instructions from endpoint 600 to adjust the microphone level or loudspeaker volume of endpoint 601, or vice versa. As another example, the control signals may include instructions sent by one of the endpoints to mute all other participants. The control signals may further provide instructions that the far endpoint establish a new connection, such as an IP connection to a website, or provide a password or a URL to the far endpoint. One use for transferring a password may be to secure a link. In multipoint conferencing, the control signals may also include instructions for a bridge to dial a specific phone number, provide billing information such as cost of the conference so far, monitor the number of conference participants, or collect polling information from conference participants.

Referring again to FIG. 6A, the local endpoint 600 receives data, and prepares the data for transmission to the remote endpoint 601 via the audio channel 620. A microphone 602 collects audio data and converts the audio data into an audio signal in the local endpoint 600. The audio signal is then fed into an amplifier 604 for adjustment.

According to one embodiment, as discussed in further detail below, a portion of the audio signal may then be filtered out using a notch filter technique. In other words, the audio signal may be passed through a notch filter, which removes audio signal content in a spectral region where a modulated carrier signal will exist, as discussed herein. Thus, the notch filter creates a notch in the audio signal frequency spectrum for embedding the digital data.

In alternative embodiments, the notch filter creates multiple notches in the audio signal frequency spectrum. The remaining portion of the audio signal frequency spectrum is utilized for the transmission of conventional audio data. Typically, the section of the audio signal frequency spectrum removed via the notch filter is as little as possible and at a higher end of the frequency spectrum typically inaudible to human ears. A carrier signal is then created and digital data is modulated onto the carrier signal to create a modulated carrier signal, which is subsequently embedded in the notch.

In another embodiment, the audio signal is prepared in advance utilizing a spread spectrum module that modulates the digital data onto the carrier signal. The spread spectrum module varies the frequency of the carrier signal across the audio signal. Accordingly, the digital data is modulated onto the carrier signal, which is either spread across the audio signal utilizing the spread spectrum module or embedded into the audio signal in the notch of the audio signal created by the notch filter.

Alternatively, the audio signal may not require preparation. A direct-sequence spread spectrum signal can be added directly to the unprepared audio signal. Further, a frequency-hopping signal, for instance, may or may not require pre-notching of the audio signal at a hopping frequency. Thus, in some embodiments, the audio signal requires little or no preparation in order to be combined with the modulated carrier signal.

In either above-described embodiment, a data source 606 provides the digital data to be forwarded via the audio channel 620. The data source 606 may include any suitable source of data. For example, the data may be from an internal source, such as a source of data within a particular company, a 232 link, etc. For instance, an internal source of the data may be data from a whiteboard.

Next, a carrier signal generator generates a carrier signal. A carrier signal modulator/demodulator 608 then modulates the digital data from the data source 606 or control data from the local data management engine 614 onto the carrier signal, as discussed herein. The carrier signal modulator/demodulator 608 can also demodulate incoming modulated carrier signals received from the one or more remote endpoints 601, or any other device suitable for use with the present invention. In the present embodiment, the carrier signal is generated by the local endpoint 600; however, the carrier signal may be obtained from any suitable source. Further, any type of modulation suitable for use with the present invention may be employed, such as amplitude modulation, quadrature phase modulation, phase or differential phase modulation, etc.

Subsequently, a product signal generator 610 creates a product signal comprising the audio signal combined with the modulated carrier signal. The modulated carrier signal is typically added to the audio signal at a very low amplitude. Low amplitude can be accomplished by pre-notching the audio signal at the modulated carrier signal frequency, as discussed herein. Resultantly, the modulated carrier signal has a low amplitude relative to audio amplitudes surrounding the modulated carrier signal amplitude, making the modulated carrier signal amplitude undetectable by a human ear. Accordingly, the modulated carrier signal is substantially inaudible to, or "masked" from, the ordinary listener. Further, sounds that are in a spectral proximity to a target signal typically render the target signal inaudible. Thus, the modulated carrier signal (i.e., target signal) is masked by the audio signal (i.e., sounds) in which the modulated carrier signal is embedded.

In one embodiment, the modulated carrier signal is modulated toward the upper end of the bandwidth spectrum, such as 3 kHz. Because the ear is less sensitive to signals at this end of the spectrum, the modulated carrier signal is inaudible to the ordinary listener. Further, the modulated carrier signal has a narrow bandwidth, as discussed herein, which allows the notching of the audio signal to be correspondingly narrow, and to thus have no perceptible effect on the audio signal.

A local communication interface 612 forwards the product signal to one or more remote endpoints 601 via the audio channel 620. Any suitable transmission medium may be employed for communicating the product signal to the one or more remote endpoint 601.

Because the carrier signal is added to the audio signal utilizing the notch filter technique or the spread spectrum technique described herein, users of a phone line experience no call interruption, as previously discussed. Accordingly, users can exchange data in addition to the normal audio signal data being carried over the phone line without experiencing any noticeable call interruption and without having to establish multiple communication channels. It is understood that this is merely one example of the use of the present invention. Other devices may be utilized to communicate other types of data. For example, overhead projectors, computers, video cameras, etc. may be utilized to communicate data via the carrier signal.

Figure 6C:
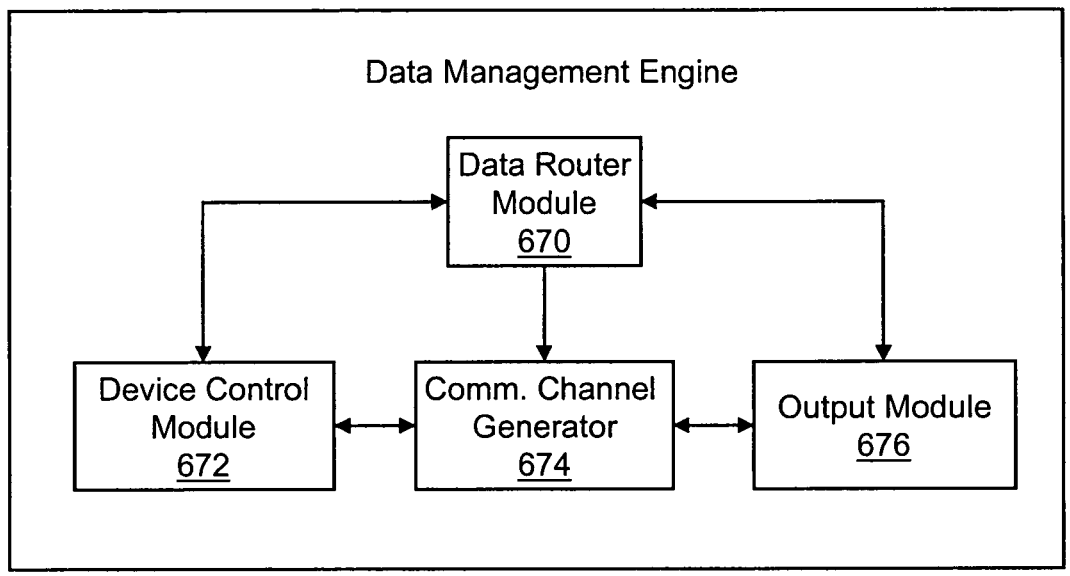

As discussed herein, the carrier signal modulator/demodulator 608 can also demodulate incoming modulated carrier signals. Once the digital data has been extracted from the incoming modulated carrier signal by the carrier signal modulator/demodulator 608, the digital data is forwarded to a local data management engine 614. An exemplary embodiment of a data management engine is shown in FIG. 6C. Although the perspective from the local endpoint 600 or the remote endpoint 601 is utilized at certain parts of this discussion for purposes of simplicity, the local endpoint 600 and the remote endpoint 601 are capable of performing identical or similar functions, due to the bi-directional nature of communication, in accordance with the present invention.

A local communication interface 612 forwards the product signal to one or more remote endpoints 601 via the audio channel 620. Any suitable transmission medium may be employed for communicating the product signal to the one or more remote endpoints 601.

The audio signal with the modulated carrier signal is received by the one or more remote endpoints 601 via a remote communication interface 302. The remote data processing engine 605 at the remote endpoint 601 recovers the product signal and the product signal module 654 separates the audio signal from the modulated carrier signal. The audio signal is typically amplified by the amplifier 656 and played via a loudspeaker associated with the remote endpoint 601. The carrier signal is demodulated by the carrier signal modulator/demodulator 658 and the digital data is processed. For example, it may be displayed via a display medium (not shown) associated with the remote endpoint 601, utilized by the remote endpoint 601, etc.

Once the digital data is recovered by the carrier signal modulator/demodulator 658, the digital data is forwarded to the remote data management engine 664. As discussed herein, the remote data management engine 664 can control functions, devices, etc. associated with an audio conference occurring via the audio channel 620, in response to the control data received. For instance, the remote data management engine 664 may instruct other devices participating in the audio conference, or itself, to adjust volume, mute some or all participants, request hangup status, request participant polling data, request billing information, etc. Other devices participating in the conference may include, for instance, other communication devices, an audio bridge, a video device, a multimedia conference bridge, projectors, the network itself, etc.

Because communication is bidirectional, the remote endpoint 601 can forward digital data including control data to the local endpoint 600 and/or other devices by modulating digital data from a data source 662 onto a carrier signal via the carrier signal modulator/demodulator 658. The product signal module 654 combines the modulated carrier signal with the audio signal received via the microphone 660 and amplified via the amplifier 656. The product signal is then forwarded to the local endpoint 600 and/or any other device via the audio channel 620. Alternatively, the digital data, audio signal, and/or product signal can be forwarded to the local endpoint 600 and/or any other device via one or more new communication channels established by the communication channel generator at the local endpoint 600 or a communication channel generator at the remote endpoint 601.

The remote data management engine 664 includes a data router module 670, a device control module 672, a communication channel generator 674, and an output module 676 as shown in FIG. 6C. Upon receipt of the product signal, the carrier signal modulator/demodulator 658 extracts the digital data from the modulated carrier signal and forwards the digital data to the remote data management engine 664, as discussed herein.

The data router module 670 examines the digital data and determines whether to forward the data to the device control module 672, the communication channel generator 674, and/or the output module 676. The data router module 670 may make the determination based on the content of the digital data, itself, a header associated with the digital data, etc. The data router module 670 forwards the data to one or more of the appropriate modules and/or based on the nature of the data. For instance, data that does not require any further action to be taken in response to the data itself, other than display of the data, may only be forwarded to the output module 676.

The device control module 672 creates instructions based on the data received from the data router module 670. The instructions generated by the device control module 672 can translate the data into control commands in order to control one or more devices associated with the remote endpoint 601 and/or the remote endpoint 601, itself. For instance, the device control module may instruct, via a control command, one or more devices to adjust volume. As another example, the device control module may instruct one or more devices to become muted. Any control command or other instruction for controlling any device associated with the remote endpoint 601 and/or any other device associated with the audio channel 620 is within the scope of the present invention. The device control module 672 can also forward the digital data, control commands, instructions, feedback, etc. to the data router module 670, the communication channel generator 674, and/or the output module 676 for further processing.

The communication channel generator 674 creates at least one new communication channel in response to the data received from the data router module 670, the device control module 672, and/or the output module 676. Alternatively, the remote communication channel generator 674 can send information pertinent to establishing the at least one new communication channel to the remote endpoint 601, itself, the local endpoint 600, and/or another device associated with the existing audio channel 620. For instance, the communication channel generator 674 can provide a meeting location, session identification, password, etc. that enables the at least one new communication channel to be successfully opened and data to be exchanged over the new communication channel.

As discussed herein, the data communicated via the audio channel 620 is as secure as the audio channel 620 itself. Thus, unless the security of the audio channel 620 has been breached in some manner, the data provided via the audio channel, such as a password, is protected.

The output module 676 determines an output medium for the data received via the data router module 670, the device control module 672, and/or the communication channel generator 674. The output module 676 may output the data via any medium suitable for use with the present invention. For instance, the data may be output via a screen, such as an LCD screen associated with a telephone, a computer screen, etc., associated with the local endpoint 600, the remote endpoint 601, and/or any other device associated with the existing audio channel 620. As another example, the data may be output via a speaker associated with the local endpoint 600, the remote endpoint 601, and/or any other device associated with the existing audio channel 620. Any method of outputting the data is within the scope of the present invention.

In accordance with one embodiment of the present invention, data may be modulated by a spread-spectrum modulator, and then added onto the audio signal at low amplitude but over all or a substantial part of the audio bandwidth. Such modulation causes the spectrum of the data to spread, so the sound is of a small amount of added noise in the audio.

Some audio signals, such as speech, have the characteristic that their amplitude changes frequency. In these cases, it is desirable to adjust the amplitude of the data component before combining it with the audio signal, in order to have the data component maintain a fairly constant amplitude relative to the amplitude of the audio signal This produces an optimal signal-to-noise ratio of the data signal for a given level of masking. It will be noted that this variation in amplitude cannot be made too quickly lest it be confused with the data modulation itself, but it turns out that the amplitude can be adjusted slowly (for example, 10 Hz amplitude adjustment bandwidth) relative to the modulating data rate, without degrading the masking effect on the audio, the quality of the audio or the reliability of the digital data.

In another implementation, the single-frequency carrier can be replaced with any common spread-spectrum implementation, such as a frequency-hopping or direct-sequence technique. This has the advantage of appearing as noise which is then added to the audio signal. It should be noted that the use of a spread-spectrum signal within the narrow audio bandwidth is itself new and novel. This has the advantage of not concentrating the digital data within a narrow spectral band, which can render it even less noticeable.

Figure 7:
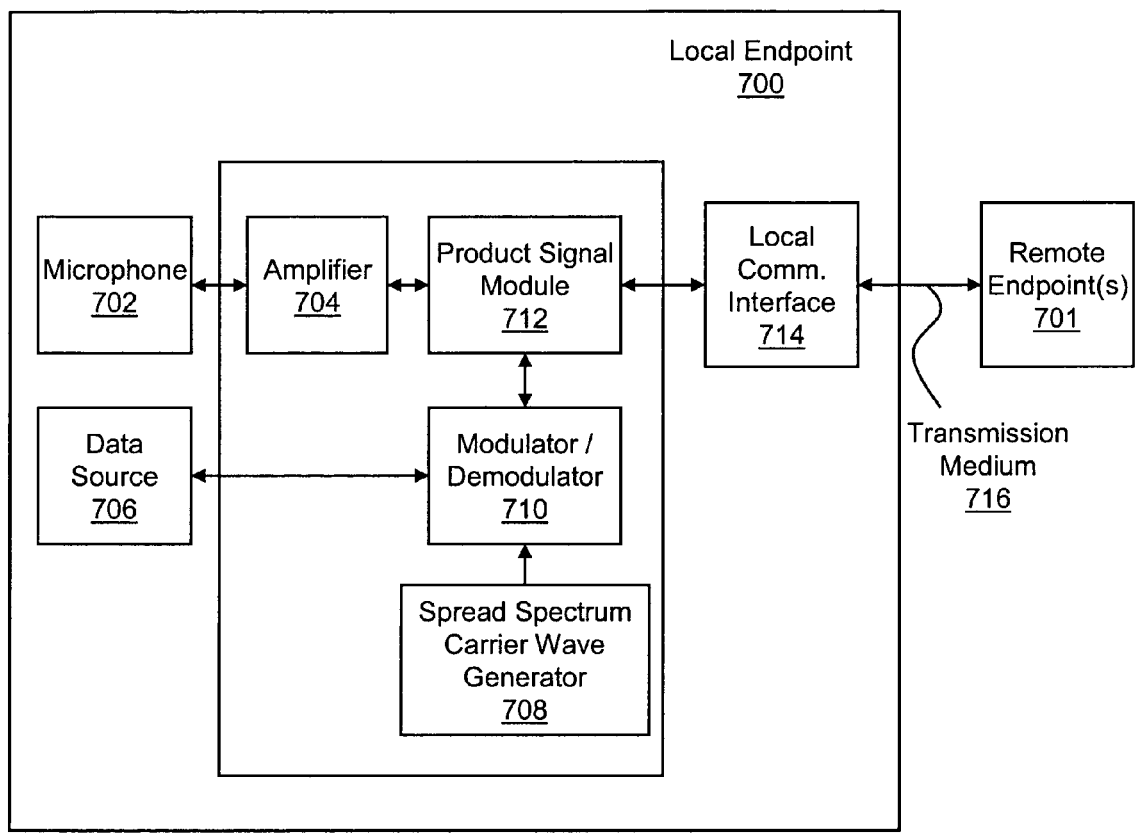
FIG. 7 depicts an exemplary block diagram of a conferencing system in accordance with one embodiment of the present invention wherein a LPSP communication protocol employing a spread spectrum technique is utilized.

Reference is now made to FIG. 7, which depicts an exemplary audio conferencing system using a spread spectrum technique. At least one microphone 702 or acoustic device collects audio data and converts the audio data into an audio signal, which is then passed through an amplifier 704. Digital data is also received from a data source 706. In this embodiment, a spread spectrum carrier wave is generated by a spread spectrum carrier wave generator 708 and provided to a modulator 710. The modulator 710 is utilized to modulate the digital data from the data source 706 onto the spread spectrum carrier wave, which is subsequently combined with the audio signal by a product signal module 712.

In one embodiment, the digital data from the data source 706 is modulated onto the audio signal at a low amplitude and over all or a substantial portion of bandwidth of the audio signal. Accordingly, the product signal module 712 causes the spectrum of the spread spectrum carrier wave to spread over all or a portion of the bandwidth of the audio signal, so the added noise from the digital data is small enough to be undetectable to the ordinary listener. Any suitable spread spectrum technique may be utilized in accordance with the present invention. For example, an ultrasonic spread spectrum technique or an audio spread spectrum technique may be utilized.

A local communication interface 714 at the local endpoint 700 forwards the product signal or combined signal to the remote endpoint 701 via the transmission medium 716, such as a PSTN, by way of the audio channel (such as the audio channel 620 of FIG. 6A). The remote endpoint 701, upon receipt of the product signal, filters the product signal and separates the audio signal from the modulated carrier signal. Subsequently, the audio signal data is output via an output medium associated with the remote endpoint 701, such as a loudspeaker. The digital data from the data source 706 is extracted and processed. The data may be output via a data output medium associated with the remote endpoint 701, such as a display medium.

Figure 8:
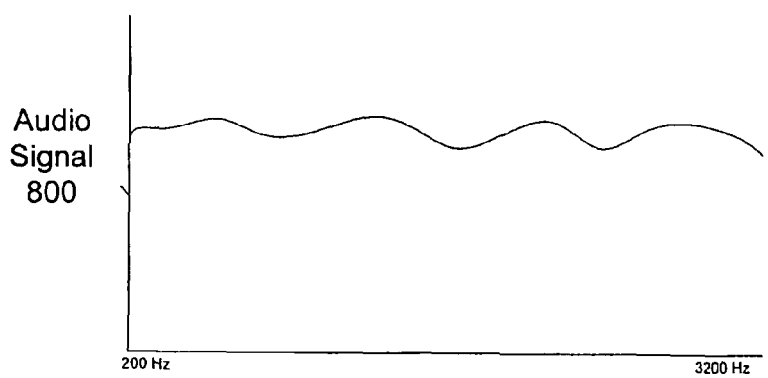
FIG. 8 depicts an exemplary audio signal in accordance with the embodiment of FIG. 7.
Figure 9:
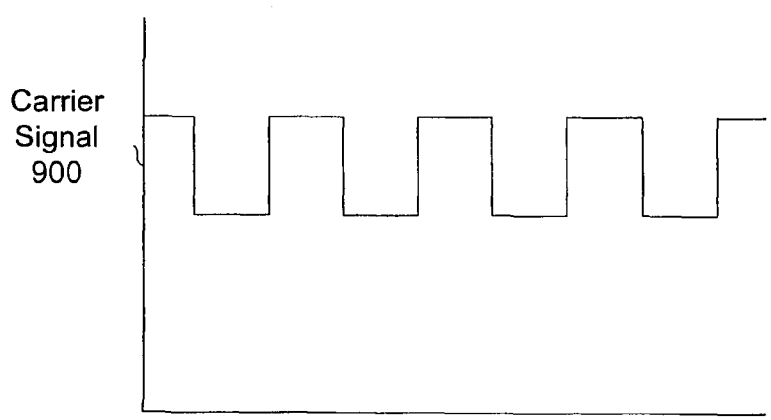
FIG. 9 depicts an exemplary carrier signal in accordance with the embodiment of FIG. 7.
Figure 10:
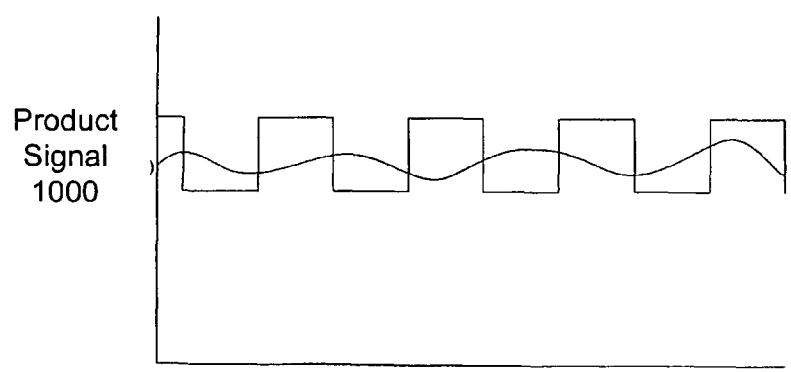
FIG. 10 depicts an exemplary product signal in accordance with the embodiment of FIG. 7.

Referring now to FIGS. 8 through 10, an exemplary spread spectrum technique is depicted. FIG. 8 illustrates a conventional audio signal 800. FIG. 9 illustrates a carrier signal 900 including digital data from the data source 706 of FIG. 7. FIG. 10 illustrates the modulated carrier signal 900 combined with the audio signal 800 to create a product signal or combined signal 1000 having the modulated carrier signal 900 spread across all or a portion of the bandwidth of the audio signal 800.

In one embodiment, the amplitude of the digital data from the data source 706 is adjusted before combining the digital data with the audio signal to create the product signal. In this embodiment, the product signal maintains a fairly constant amplitude relative to the amplitude of the audio signal. An optimal signal-to-noise ratio of the data signal for a given level of masking is maintained by maintaining the fairly constant amplitude of the modulated carrier signal relative to the amplitude of the audio signal. The amplitude of the modulated carrier signal is typically adjusted slowly relative to the modulating data rate in order to prevent degrading of the masking effect on the audio, quality of the audio, or reliability of the digital data.

In another embodiment of the present invention, a single-frequency carrier can be replaced with any common spread-spectrum implementation, such as a frequency-hopping or direct-sequence technique. Replacing the single-frequency carrier with the common spread-spectrum implementation may create the appearance of noise, which can then be added to the audio signal. The added noise is uniform and at a lower level than the audio signal. Thus, the audio signal retains its full bandwidth, with some added background noise, instead of clipping part of the bandwidth completely, as with the notch filter 306.

Figure 11A:
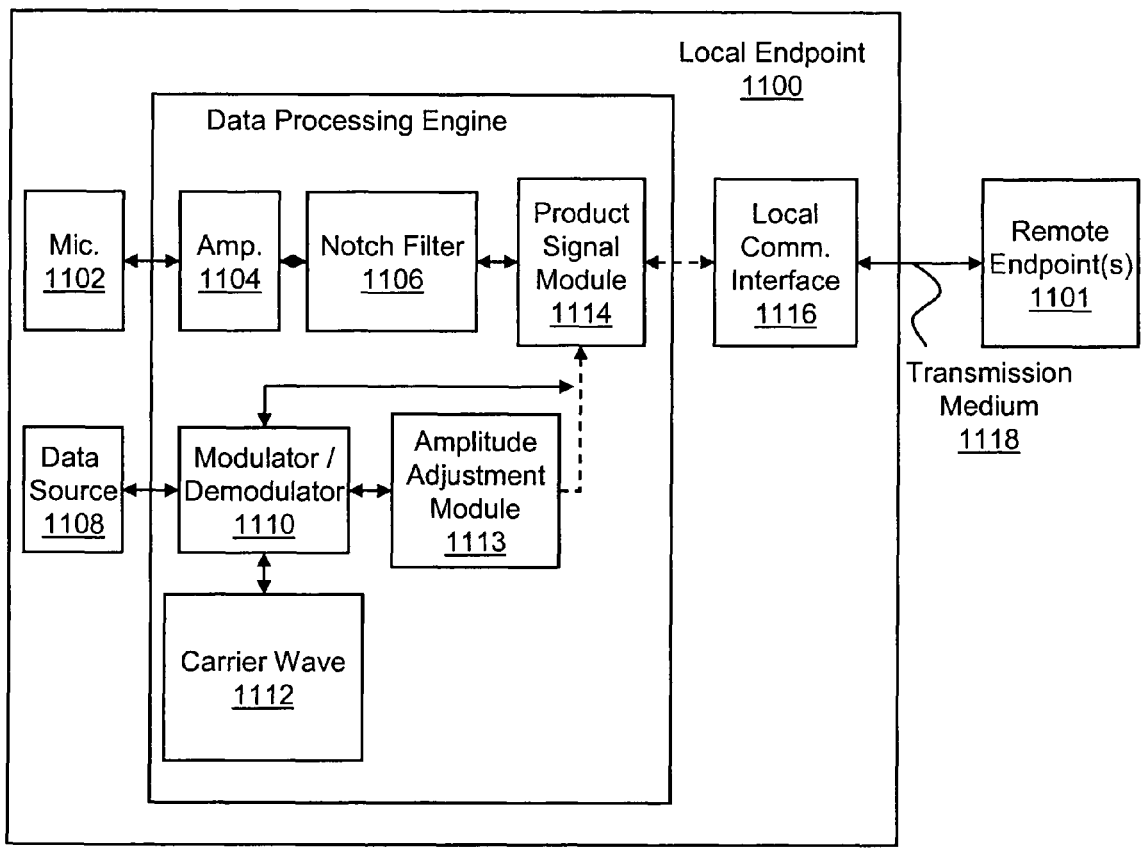
FIGS. 11A and 11B depict an exemplary block diagram of a conferencing system in accordance with one embodiment of the present invention wherein a LPSP communication protocol employing a notch filter is utilized.
Figure 11B:
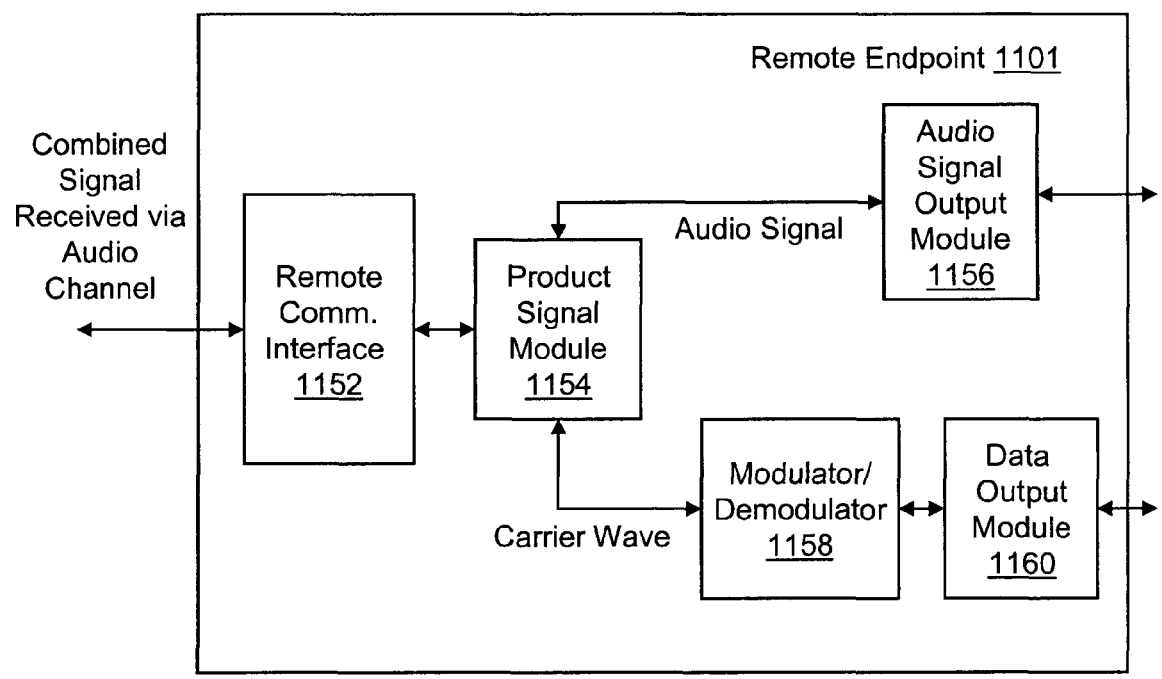

Reference is now made to FIGS. 11A and 11B, which depict a conferencing system for sending digital data over the audio channel (such as the audio channel 620 of FIG. 6A) in accordance with an alternative embodiment of the present invention. In this example, a local endpoint 1100 prepares the digital data for transmission to one or more remote endpoints 1101 via the audio channel. At least one microphone 1102 or other acoustic device collects audio data and converts the audio data into an audio signal. The audio signal is then fed into an amplifier 1104 for adjustment.

A portion of the audio signal is then filtered out by a notch filter 1106. In other words, the audio signal is passed through the notch filter 1106, which removes content in a spectral region where a modulated carrier signal will exist, as discussed herein. The notch filter 1106 creates a subset of the audio signal frequency spectrum for forwarding the digital data.

In an alternative embodiment, the notch filter 1106 creates multiple subsets of the audio signal frequency spectrum. The remaining portion of the audio signal frequency spectrum is utilized for the transmission of normal audio data. Typically, the portion of the audio signal frequency spectrum removed via the notch filter 1106 is as little as possible and at the higher end of the frequency spectrum. For example, a 3000 to 3100 Hertz (Hz) portion of the frequency spectrum of a conventional phone line, which accommodates data between 300 to 3300 Hz, may be reserved for sending data across the audio channel.

A data source 1108 provides digital data to be forwarded via the audio channel. This data may include, but is not limited to, data from a whiteboard, a projector, a computing device, etc. This data may further include control data as described above. A signal generator 1112 creates a carrier signal, which is forwarded to a modulator 1110. The modulator 1110 then modulates the digital data from the data source 1108 onto the carrier signal. In one embodiment, the modulator 1110 determines the spectrum associated with the audio signal. Any type of modulation suitable for use with the present invention may be employed, such as amplitude modulation, quadrature phase modulation, phase or differential phase modulation, and so on.

Optionally, an amplitude adjustment module 1113 may be provided for adjusting the amplitude of the modulated carrier signal proportionally to an instantaneous amplitude of the audio signal. The adjustment may be made in a region of a spectrum near a region occupied by the modulated carrier signal.

Once modulated, the modulated carrier signal is forwarded to a product signal module 1114 where a product signal of the audio signals combined with the modulated carrier signal is created. Accordingly, the modulated carrier signal is embedded into the audio signal in the portion of the audio signal filtered out by the notch filter 1106. In the embodiment having multiple subsets of the audio signal reserved by the notch filter 1106, multiple carrier signals are created and embedded into the audio signal in the subsets of the audio signal frequency spectrum reserved therefore. The modulated carrier signal is typically added to the audio signal at a very low amplitude. Accordingly, the modulated carrier signal is substantially inaudible to, or "masked" from, the ordinary listener. A local communication interface 1116 communicates the product signal to the remote endpoint 1101 by way of the existing audio channel via a transmission medium 1118. Any suitable transmission medium 1118 may be utilized in accordance with the present invention.

The data source 1108 may include any suitable source of data. For example, the data may be from an internal source, such as a source of data within a particular company, a 232 link, etc. For instance, an internal source of the data may be the data from a whiteboard, data from an internal server, data from a computing device, etc.

Figure 12:
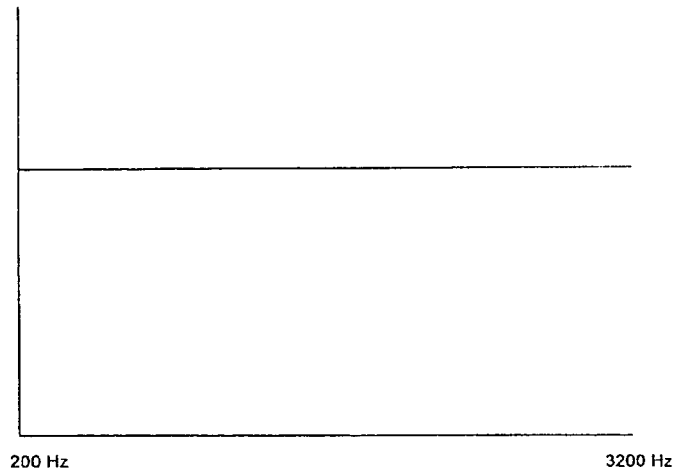
FIG. 12 depicts an exemplary audio signal frequency spectrum in accordance with the embodiment of FIGS. 11A and 11B.

Referring now to FIG. 12, an exemplary audio signal frequency spectrum 1200 is shown. As discussed herein, in order to send the digital data in addition to the audio data being communicated via the audio signal, a portion of the audio signal frequency spectrum 1200 is reserved. Typically, a conventional phone line can accommodate data between 200 to 3200 Hertz (Hz). A portion of that audio signal frequency spectrum 1200 is reserved for sending data in addition to, and/or separate from, the normal audio signals being carried across the audio channel. For example, the 3000 to 3100 Hz portion of the frequency spectrum may be reserved for sending data across the existing audio channel. However, reserving any portion of the audio signal frequency spectrum 1200 of the audio signal is within the scope of the present invention. While reserving the portion of the audio signal frequency spectrum 1200 may slightly diminish capacity for sending audio signals, this process allows for the exchange of additional data across the existing audio channel. Advantageously, users of the phone line experience no call interruption or distortion in the transmitted audio. Accordingly, users can exchange data in addition to the normal audio signal data being carried over the audio channel without experiencing any noticeable call interruption and without having to establish multiple communication channels. It is understood that this is merely one example of the use of the present invention. Other devices may be utilized to communicate other types of data. For example, overhead projectors, computers, video cameras, etc. may be utilized to communicate data via the carrier signal.

Figure 13:
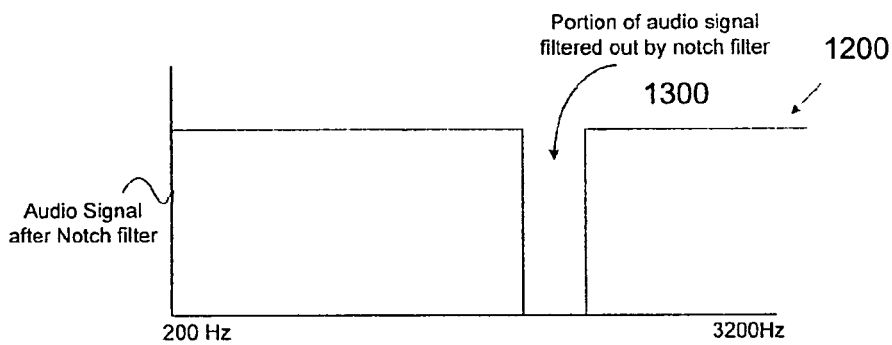
FIG. 13 depicts an exemplary audio signal frequency spectrum after filtering in accordance with the embodiment of FIGS. 11A and 11B.
Figure 14:
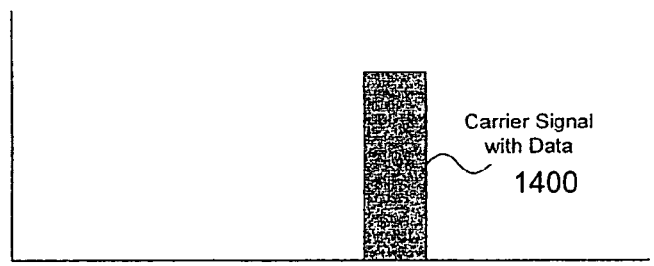
FIG. 14 depicts an exemplary modulated carrier signal in accordance with the embodiment of FIGS. 11A and 11B.

Referring now to FIG. 13, the audio signal frequency spectrum 1200 after being filtered by the notch filter 1106 is shown. A portion 1300 of the audio signal frequency spectrum 1200 has been filtered out by the notch filter 1106. A modulated carrier signal 1400 is created for insertion into the portion 1300 of the audio signal frequency spectrum 1200, as shown in FIG. 14.

Figure 15:
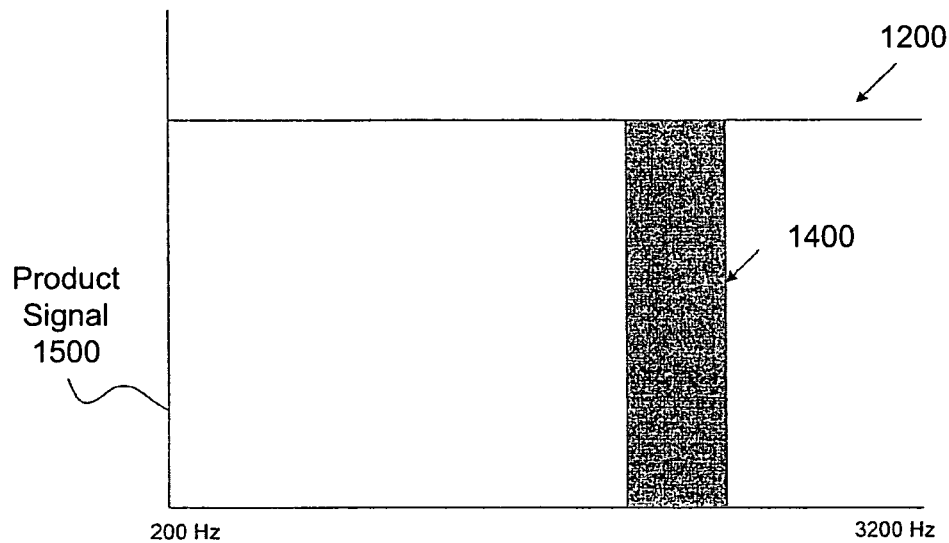
FIG. 15 depicts an exemplary product signal in accordance with the embodiment of FIGS. 11A and 11B.

Referring now to FIG. 15, a product signal 1500 in accordance with an embodiment of the present invention is shown. The product signal 1500 is the combination of the audio signal frequency spectrum 1200, the audio signal frequency spectrum 1200 portion 1300 filtered out by the notch filter 1106 of FIG. 11A, and the modulated carrier signal 1400 inserted into the portion 1300. As discussed herein, the product signal module 1114 of FIG. 11A combines the audio signals and the modulated carrier signal 324. The product signal 1500 is then communicated to the remote endpoint 1101 by the local communication interface 1116 of the local endpoint 1100 via a transmission medium 1118.

In one embodiment, the amplifier 1104 of FIG. 11A can adjust the amplitude of the modulated carrier signal 1400 proportionally to an instantaneous amplitude of the audio signal 1200. In this embodiment, the adjustment may be made in a region of the spectrum occupied by the modulated carrier signal 1400.

Data Extraction by Remote Endpoint

The audio signal with the modulated carrier signal (i.e., product signal 1500 of FIG. 15) is initially received by a remote communication interface 1152, and forwarded to a product signal module 1154, which separates the audio signal from the modulated carrier signal. The audio signal may be output by the audio signal output module 1156. For instance, the audio signal may be amplified and played via a speaker associated with the remote endpoint 1101. The speaker may be located in the remote endpoint 1101 or, alternatively, the speaker may be external to the remote endpoint 1101.

Substantially concurrently, the modulated carrier signal 1400 is sent to a demodulator 1158, which demodulates the modulated carrier signal 1400. Subsequently, the digital data is forwarded to a data output module 1160, which can output the data to the user. For example, the data may be displayed via a display medium associated with the remote endpoint 1101, utilized by the remote endpoint 1101, etc. As discussed herein, the present system works in a bidirectional manner in order to respond to the digital data received from the local endpoint 1100 or to otherwise send data to the local endpoint 1100.

In accordance with one embodiment of the present invention, a speakerphone device is provided that can send, transmit, and process control data embedded with audio data according to any of the above-described protocols (IP, modem, serial I/O, and LPSP). The speakerphone can send, transmit, and process signals over a PSTN. The speakerphone can send, transmit, and process signals over an IP-based network. The speakerphone can provide narrowband audio and data conferencing. The speakerphone can also provide wideband audio and data conferencing.

Figure 18:
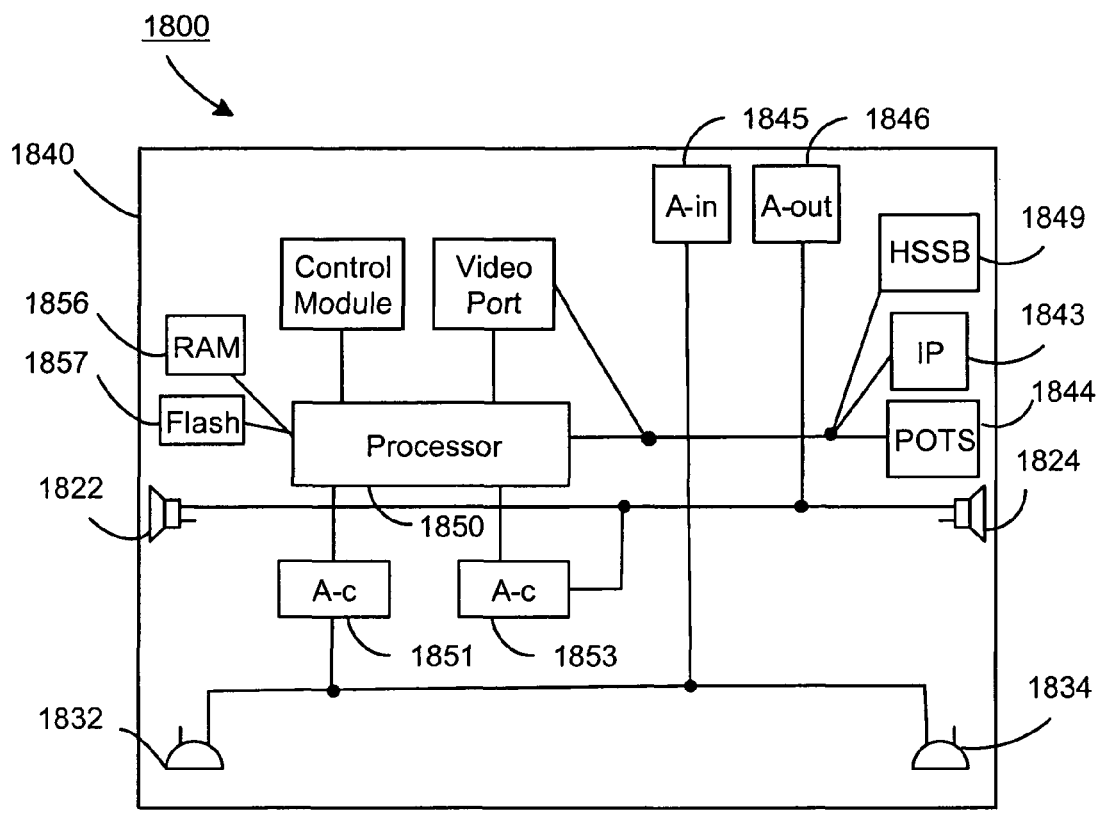
FIG. 18 depicts an exemplary block diagram of a speakerphone in accordance with one embodiment of the present invention wherein capability for a variety of communication protocols is provided.

An exemplary speakerphone 1800 is depicted in FIG. 18. The speakerphone device can control functions of a remote endpoint, including but not limited to another speakerphone or a bridge. As control data is bidirectional, the speakerphone's functions can be controlled by a remote endpoint, including but not limited to another speakerphone or a bridge.

Certain kinds of data are particularly well suited to sharing the channel with voice. These tend to be kinds of data that supervise and monitor the function and performance of voice-related devices. For example, the speakerphone 1800 can establish and control additional communication channels and device from within an existing voice channel. Furthermore, the speakerphone 1800 can use an existing secure audio connection to initiate a secure second connection. The speakerphone 1800 can also command a conference bridge to collect polling information from other conference participants, as described further above. The speakerphone 1800 can also send a password or URL information to another telephone. The speakerphone 1800 can also monitor the number of participants on a bridge call by receiving this information from the bridge, as described further herein. In addition, the speakerphone 1800 can facilitate VGA video and image collaboration by using phone-line data to establish and manage a separate graphics connection.

In addition, the speakerphone 1800 can instruct the bridge to collect polling, voting, or roll call information from the conference participants. For example, participants in an audio conference may vote on an issue or answer a question, by using DTMF or voice responses. The bridge receives the responses and can provide a report of the results to one or more participants. Advantageously, the ability to provide real-time polling functionality provides immediate feedback and enables quick decision making.

In addition, the bridge can allow a participant to monitor the number and names of participants on an audio conference. For example, the bridge can send messages to a participant such as the supervisor identifying the current number of participants (e.g., "Currently 3 participants"). The bridge can also send messages to a participant such as the supervisor, indicating the identity and/or location of the participants (e.g., "Currently 3 participants: Polycom-Austin; Polycom-Milpitas; and Polycom-Andover"). The messages can be sent at regular intervals (e.g., every minute). The messages can also be sent upon request by an endpoint. The messages can also be sent whenever there is a change in the number of participants. In addition, whenever a participant joins the conference, the bridge can send messages to a participant such as the supervisor, indicating who has just joined the conference (e.g., "Polycom-Pleasanton has joined"). Whenever a participant leaves the conference, the bridge can send messages to a participant such as the supervisor, indicating who has just left the conference (e.g., "Polycom-Milpitas has left").

In addition, the speakerphone 1800 can implement LPSP to add a variety of features, such as IP-like applications, e.g., polling, talker identification, volume control, etc. As another example, the voice connection is the most straightforward place to embed data related to that voice channel. A conference participant may be in a conference room with multiple microphones, and it may be useful to embed information specifying which microphone is being selected at each moment to aid in talker identification.

The foregoing are illustrative examples of control functions wherein a speakerphone may control or be controlled by another endpoint including a bridge. The foregoing examples are illustrative only and are not intended to be exhaustive. It will be appreciated by one skilled in the art that additional types of control functions are within the scope of the present invention.

Figure 16:
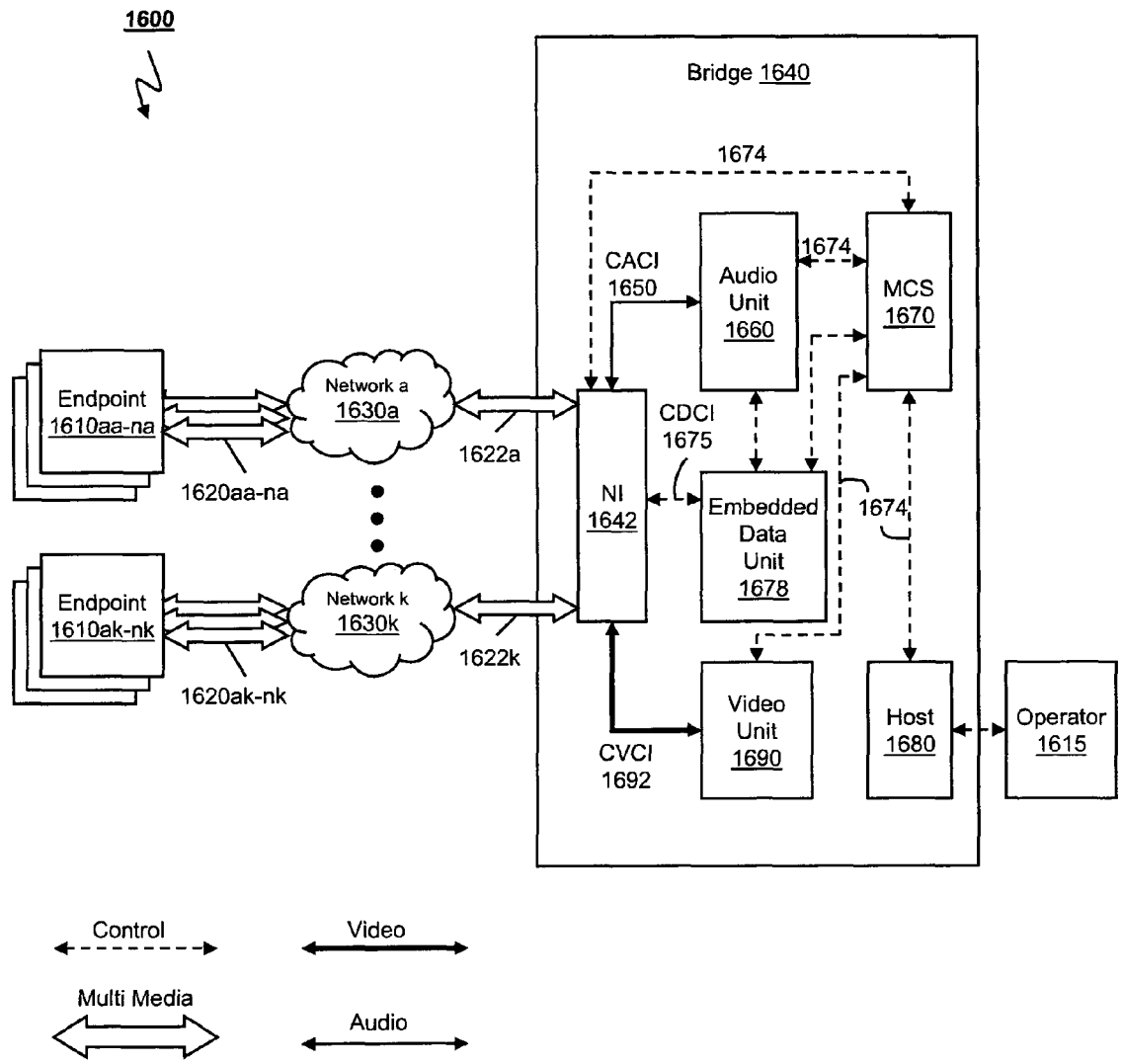
FIGS. 16 and 17 depict an exemplary block diagram of a conferencing system comprising a bridge in accordance with one embodiment of the present invention.

Reference is now made to FIG. 16, which depicts an exemplary block diagram illustrating a general description of a conference environment 1600 including endpoints 1610aa-nk, operator 1615, multimedia signals 1620aa-nk, multimedia signals 1622a-k, networks 1630a-k, and bridge 1640. In one exemplary embodiment, the bridge 1640 may include a network interface ("NI") 1642, Compressed Audio Common Interface ("CACI") 1650, audio unit 1660, Management and Control System ("MCS") 1670, control signals 1674, embedded data unit 1678, host 1680, and video unit 1690. Other exemplary embodiments may not have a video section and may be used for audio conferences only.

The pluralities of endpoints 1610aa-nk are connected via the plurality of networks 1630a-k to the bridge 1640. The bridge 1640 may be an MCU, or an audio only multipoint control unit (an audio bridge), for example. The bridge 1640 and/or some or all of its components are logical units that may be implemented by hardware and/or software and/or firmware. The MCS 1670 may be a control module and may be a logical unit that controls the operation of the bridge 1640.

The endpoints 1610aa-nk comprise terminals on a network, capable of providing one-way or two-way audio and/or visual communication with other terminals or with the bridge 1640. The information communicated between the terminals and/or the bridge 1640 may include control signals 1674, indicators, audio information, video information, and data. A terminal may provide any combination of several different types of inputs and/or outputs, such as speech only, speech and data, a combination of speech and video, or a combination of speech, data, and video.

The network interface 1642 receives multimedia communications 1622a-k via a plurality of networks 1630a-k and multimedia signals 1620aa-nk from the plurality of the endpoints 1610aa-nk, and processes the multimedia communication according to communication standards that are used by each type of network, such as, but not limited to, H.323, H.321, SIP, and/or H.320. The network interface 1642 then delivers compressed audio, compressed video, compressed data, and control streams to appropriate logical modules in the bridge 1640. Some communication standards require that the process of the network interface 1642 include demultiplexing the incoming multimedia communication into compressed audio, compressed video, compressed data, and control streams. In the opposite direction, the network interface 1642 receives the separate streams from the various units (e.g., the MCS 1670, audio unit 1660, and/or video unit 1690) and processes the streams according to the appropriate communication standard. The network interface 1642 then transmits the streams to the appropriate network 1630a-k.

The audio unit 1660 receives the compressed audio streams of the plurality of endpoints 1610aa-nk via the network interface 1642 and CACI 1650, processes the audio streams, mixes the relevant audio streams, and sends the compressed mixed signal via the CACI 1650 and the network interface 1642 to the endpoints 1610aa-nk. Audio unit 1660 may be a logical unit and is described in more detail below in conjunction with FIG. 17.

The video unit 1690 may be a logical unit that receives and sends compressed video streams. The video unit 1690 includes at least one video input module that handles an input portion of a video stream 1692 from a participating endpoint and at least one video output module that generates a composed compressed video output stream that is sent via Compressed Video Common Interface ("CVCI") 1692 to network interface 1642 and from there to the designated endpoints 1610aa-nk.

The uncompressed video data is shared by input and output modules on a common interface such as, but not limited to, Time Division Multiplexing ("TDM"), Asynchronous Transfer Mode ("ATM"), and/or shared memory. The data on the common interface may be fully uncompressed or even partially compressed. An exemplary operation of such a video unit is described in U.S. Pat. No. 6,300,973, the contents of which are incorporated herein by reference.

The host 1680 communicates with the operator 1615 of the bridge 1640. The operator 1615 may have an operator's station for communicating with the host 1680. The host 1680 controls the bridge 1640 via the MCS 1670 according to instructions from the operator 1615.

Figure 17:
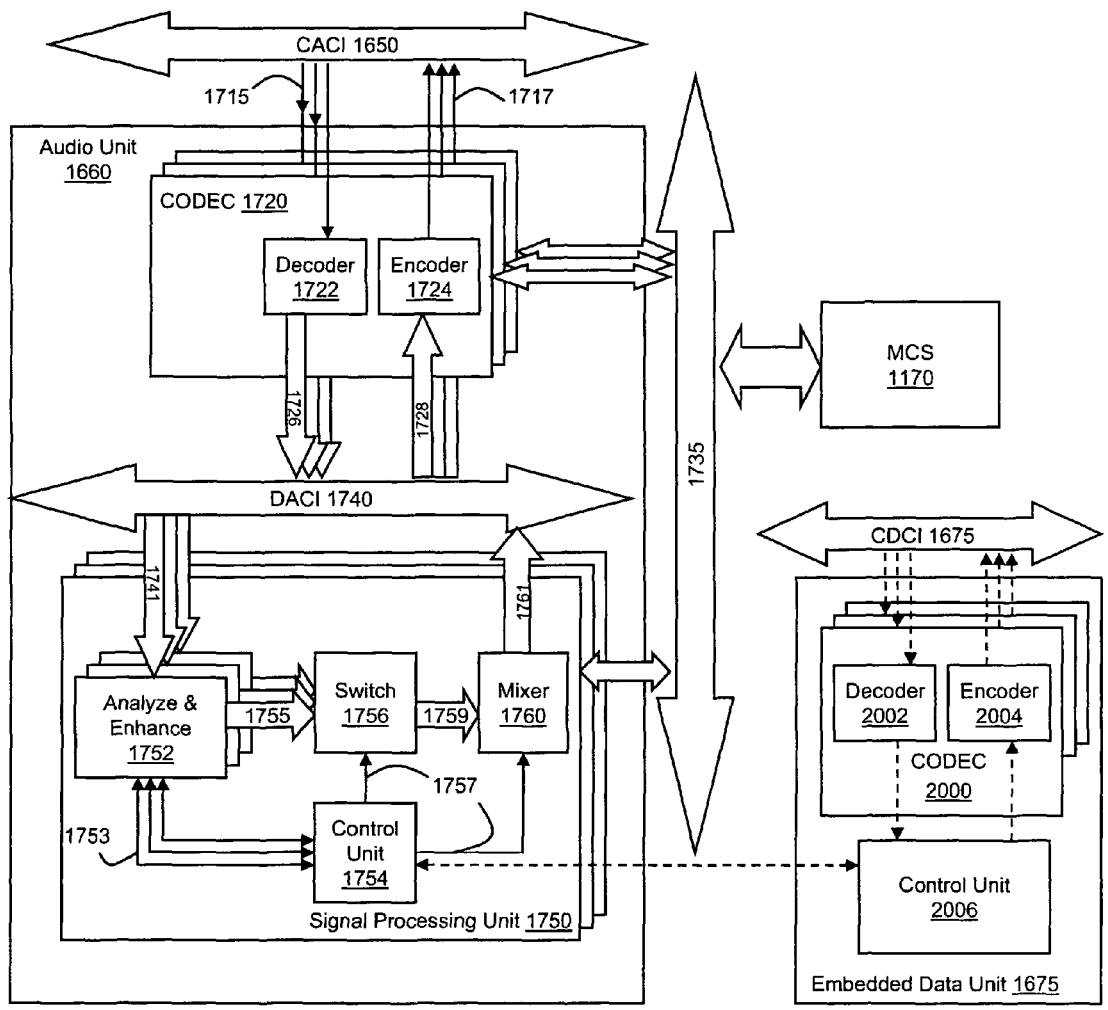

FIG. 17 depicts an exemplary block diagram of an embodiment of the present invention including a more detailed description of the audio unit 1660 and the embedded data unit 1678 of FIG. 16.

The audio unit 1660 includes compressed signals 1715 and 1717, codecs 1720, decoded information 1726, mixed output 1728, and signal processing unit 1750. Each codec 1720 includes a decoder 1722 and an encoder 1724. The signal processing unit 1750 includes an analyze and enhance unit 1752, information signal 1753, control unit 1754, switch 1756, control signals 1757, selected signals 1759, mixer 1760, and mixed signal 1761. Compressed audio streams from all endpoints that are connected to an MCU are transferred over the CACI 1650. The MCS 1670 allocates the codec 1720 to one of the endpoints 1610aa-nk (FIG. 16).

Further, the CACI 1650 carries signals to and from endpoints 1610aa-nk. For example, the compressed signal 1715 from one of the endpoints 1610aa-nk is routed through the CACI 1650 to the decoder 1722 in the codec 1720, which was previously allocated to that endpoint by the MCS 1670 via control bus 1735.

The decoder 1722 may be a logical unit and may decode a compressed audio stream, based on communication standards such as, but not limited to, G.723.1, G.728, G.729, and MPEG. The decoder 1722 then decodes the compressed audio stream, such as compressed signal 1715, and broadcasts the decoded signal 1726 over the Decoded Audio Common Interface ("DACI") 1740.

The DACI 1740 is a bus that may have broadcasting capabilities. The DACI 1740 may be implemented for example by any one of or any combination of Time Division Multiplexing (TDM), Asynchronous Transmission Mode (ATM), Local Area Network (LAN), wireless technology, or shared memory. The signal processing unit 150 may then grab the decoded signal from the DACI 1740 and may analyze, enhance, and/or mix the decoded signal and return the output 1761 to the DACI 1740.

The encoder 1724 may be a logical unit and may be an enhancement and/or encoding unit. The encoder 1724 may compress the output 1728 of the appropriate signal processing unit 1750 forming a compressed audio stream, such as the compressed signal 1717, based on the communication standard such as, but not limited to, G.723.1, G.728, G.729, and/or Motion Picture Expert Group ("MPEG").

The MCS 1670 generates a Cross-Conferences Database ("CCDB") based on the required setup of all the participants and all the conferences that currently exist in the MCU. The CCDB is a Cross-Conference Database that holds the connection parameters (e.g., codecs and processing units, etc.) and the connection status (e.g., Normal, Mute, etc.) of each endpoint (participant) that is currently connected to the MCU, in every conference that is currently managed by the MCU. The CCDB enables the participation of at least one participant in more than one conference. According to the CCDB, the MCS 1670 programs one or more signal processing units 1750 to grab from the DACI 1740 the decoded signals of all the participants associated with a conference that is assigned to those signal processing units 1750.

The decoded output of any codec 120 can be grabbed by more than one signal processing unit 1750, allowing the participants to be associated with more than one conference. The decoded streams from the decoders 1722 on the DACI 1740 may be grabbed by the signal processing unit 1750 and then analyzed and enhanced by the analyze and enhance unit 1752.

The analyze and enhance unit 1752 may be a logical unit, and may include a set of algorithms for analyzing an audio stream of a participant and/or enhancing its quality, such as, but not limited to, International Telecommunications Union (ITU) G.165 (echo canceling), Dual Tone Multi-Frequency (DTMF) suppression, noise reduction, and/or Voice Activity Detector (VAD).

The signal processing unit 1750 may have one or more analyze and enhance units 1752. Each analyze and enhance unit 1752 may be assigned to a single participant and programmed according to the connection status of that participant in the conference.

The control unit 1754 controls a conference that receives all signals from the analyze and enhance unit 1752 and selects the participants that will be routed via switch 1756 to the mixer 1760. The mixer 1760 receives the enhanced streams from all of the selected participants and supplies each participant with an uncompressed mixed audio stream of the selected participants. Signals from the analyze and enhance unit 1752 are sent to the control unit 1754, and the enhanced decoded audio signals are sent from the analyze and enhance units 1752 to the switch unit 1756.

The switch unit 1756 is a selector that receives the decoded streams from all the participants in a conference and transfers the selected streams to the mixer 1760. The selection is based on the decisions of the control unit 1754. Based on received commands from the MCS 1670, which define the connection status of the participants in the conference that is assigned to the signal processing unit 1750, and the information signal 1753 from the analyze and enhance unit 1752, the control unit 1754 controls, via control signals 1757, the switch 1756, and the mixer 1760. For example, in a case where a participant's connection status is Normal (N), the analyze and enhance unit 1752 that is associated with that participant may indicate that the voice signal meets a certain criteria such as set forth by VAD, (e.g., such as the energy level being above a certain value.). Then, the control unit 1753 via switch 1756 selects the output of the analyze and enhance unit 1752, which is assigned to the participant, as one of the inputs to the mixer 1760. The mixer 1760 mixes the selected audio signals to form the mixed signal 1761, and broadcasts the mixed signal 1761 over the DACI 1740. Some embodiments of the signal processing unit 1750 have the capability of eliminating the voice of a speaker from the mixed signal that is aimed to the endpoint of that speaker.

The MCS 1670, based on the connection status stored in the CCDB, commands one or more codecs 1720 to grab the mixed output 1728 from the DACI 1740 for listening to the conference. After grabbing the mixed output 1728 from the DACI 1740, the encoder 1724 encodes the decoded signal from the appropriate signal processing unit 1750, and sends the compressed signal 1717 via the CACI 1650 to the appropriate participant.

The codecs 1720 and the signal processing units 1750 may be implemented by Digital Signal Processors (DSPs). One DSP can include more than one unit (e.g., more than one codec and/or bridge). In the above example, the codec 1720 handles one participant's audio signal, and the signal processing unit 1750 handles one conference.

In accordance with one embodiment of the present invention, the network interface 1642 receives the endpoint signal and determines if there is a separate data channel encoded along with the audio channel, as would be the case for IP communications and modem communications. If so, the network interface 1642 detects these data channels and provides them over a Common Data Channel Interface (CDCI) 1675 to embedded data unit 1678. If the data is provided as LPSP data, e.g., notch or spread spectrum over IP, ISDN, modem or analog links, this will travel conventionally over the CACI 1650 to the audio unit 1660. Reverse operations occur for data which is to be transmitted to an endpoint either as LPSP format from the audio unit 1660 or as a separate data channel from the embedded data unit 1678.

The embedded data unit 1678 includes a series of codecs 2000, each of which includes a decoder 2002 and an encoder 2004. The decoders 2002 and encoders 2004 are each connected to particular channels of the CDCI 1675 so that they can detect channels from particular endpoints, similar to the manner in which the codecs 1720 in the audio unit 1660 detect it from individual endpoints. The decoder 2002 provides decoded control level information, i.e., high function level information to a control unit 2006. The two control units provide the higher level control information as appropriate to the encoder 2004. In this manner, the control unit provides the actual processing and operations of the control information as described above and below.

The operation of the bridge without decoding the data may be accomplished by assigning priority to the data based on the existence of LPSP data rather than the content of the data. Accordingly, the data is not decoded since it can be identified as LPSP data without doing so.

In another embodiment, the bridge architecture is utilized to detect and decode LPSP signals and use them to control operations and to participate in a management link with one or more participants to a conference. As described above, the endpoint could request various operations of the bridge which would require the bridge to prepare and transmit appropriate data, not just necessarily to the requesting endpoint but also potentially to all capable endpoints. Examples of operations suitable for receipt by all endpoints include performing a roll call, indicating the participants names on entering and leaving, providing a live status on the number of participants, identifying the current talker, displaying conference information to a new joiner, providing Caller ID information about joining parties; providing voting capabilities and providing vote results, providing a list of available conferences and accepting a selection; and identifying a noisy endpoint. An advanced feature that the bridge can provide is that it can act as an instant messaging (IM) server for the participating endpoints.

In yet another embodiment, the bridge architecture shares LPSP data among multiple users by separating the LPSP band, notching other participants if appropriate, and incorporating an LPSP source into signals transmitted to other participants. These activities are accomplished without decoding the data for its content.

In the case of LPSP data, the analyze and enhance unit 1752 determines if LPSP data, e.g., notch or spread spectrum, is present. If so, a presence detect indication is provided to control unit 1754. If the control unit 1754 desires to actually determine what the particular data is, then the analyze and enhance unit 1752 provides the decoded LPSP data to the control unit 1754 as described further below. If the control unit 2006 of the embedded data unit 1678 determines that data is to be provided to an endpoint over an LPSP channel, this data is provided from the control unit 2006 to the control unit 1754. The control unit 1754 will then provide the data to the analyze and enhance unit 1752 which will then encode it in the proper format so that it can be then switched and mixed in conventional fashion. The control unit 1754 provides the presence or actual LPSP data to the control unit 2006 for its control of the data/control operations according to the present invention.

Various operations and functions of the control unit 2006 include determining the actual LPSP data and its destination. If the destination is the bridge itself, then the control unit 2006 provides this information to the MCS 1670 over a control channel 1674. Similarly, if the MCS 1670 provides information to the control unit 2006, this is provided back to the particular and appropriate endpoints 1610*aa-nk*. This control information can be similar to that as described above. In this manner or if instead it is LPSP data or other data directed to a particular endpoint, then the control unit 2006 determines that the data is to be transmitted to a particular end unit and appropriately either instructs the codecs 2000 or the control unit 1754 to properly transmit such data from the incoming channel to a desired outgoing channel.

Alternatively, if it is not desired to actually have the bridge be controlled by the particular endpoint but merely to allow transfer of the LPSP or data channels to the other endpoints, the control unit 2006 would merely instruct the codecs 2000 and control unit 1754 to look for the actual presence of the particular data streams. If only a single data stream is present, the control units 1754 and 2006 instruct the codecs 2000 and the analyze and enhance units 1752 to extract the data stream without decoding it and replicate it to the other desired endpoints. If multiple data streams are present and full duplex operation is available, then the codecs 2000 and analyze and enhance units 1752 will replicate the data streams to the appropriate endpoints. If multiple data streams were present and this was not a full-duplex operation, as could be done in the case of LPSP spread spectrum or multiple data channels in an IP or modem environment, then the control unit 2006 would properly blank or cut off communications from any device that was not the designated master device, so that only the master could do communications in a half-duplex format and not have slave endpoints causing data collisions. When the master has completed operations, only a single slave should respond and its data stream would be provided to the master. Thus, the control unit 2006 could perform all of the above described control functions as appropriate with one or multiple endpoints at any given time by appropriately receiving or providing data to the particular endpoints in a separated manner, either by the use of individual separately controlled data channels or by properly instructing the analyze and enhance unit and control unit 1754 to provide individual data to the particular endpoints.

In addition, in accordance with one embodiment of the present invention, the bridge can translate a DTMF signal, for instance, into an LPSP signal. Conversely, the bridge can translate an LPSP signal into a DTMF signal.

A conventional multipoint bridge turns off all but the loudest talkers to keep the background noise down. In the common variants somewhere between 1 and 6 talkers or endpoints are turned on at once, depending on the bridge and its settings. Because LPSP is intentionally created at a very soft level, the data channel is not loud enough to get through a conventional multipoint bridge by itself because the volume is too low to activate the active talking detection in the bridge. Recognizing that LPSP is associated with a telephone or speakerphone, with a human sitting there who is probably going to be talking at some point, there are several techniques that can be used to allow LPSP data to be transferred using the conventional microphone gating techniques.

a. Send LPSP messages continuously. Chances are that the local person will talk sometime so that their speech will open up the conventional multipoint bridge, and the LPSP message will then ride on top of it and get through.

b. Do (a), but with some limitations. Example limitations include sending a one-second LPSP message every five seconds for one minute, then stopping. This works well in cases where the LPSP control task is to set up the channel for a presenter to show their slides because people rarely put up their slides without saying a word.

c. Monitor the outgoing speech level, and only generate an LPSP message when the outgoing speech is loud enough. This allows the generating system to send fewer messages, and to have more confidence that it will get through.

d. If some time has passed and the generating system has not successfully sent an LPSP message, either make it much louder or generate a short synthetic noise to force the conventional multipoint bridge open so LPSP can get through.

The invention has been explained with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A conference endpoint for communicating with a second conference endpoint, the conference endpoint comprising:
    an audio processing unit;
    a control module communicably coupled to the audio processing unit; and
    a network interface communicably coupled to the control module;
    wherein the control module is operable to transmit control data in-band with audio data to the second conference endpoint via an audio communication channel;
    wherein the control data comprises an instruction from the conference endpoint that the second conference endpoint establish a second communication channel; and
    wherein the control data is substantially humanly inaudible.

2. The conference endpoint of claim 1, wherein the conference endpoint is remote from the second conference endpoint.

3. The conference endpoint of claim 1, wherein the second communication channel comprises a video link.

4. The conference endpoint of claim 1, wherein the audio communication channel comprises a POTS connection.

5. The conference endpoint of claim 1, wherein the audio communication channel comprises an IP connection.

6. The conference endpoint of claim 1, wherein the second communication channel comprises an IP connection.

7. The conference endpoint of claim 1, wherein the network interface sends and receives data according to a protocol selected from the group consisting of IP, modem data, local serial digital input/output, ISDN, and analog.

8. The conference endpoint of claim 1, wherein the conference endpoint is selected from the group consisting of a computer with a microphone and speaker, an audio communication device without the control module combined with a separate control module, a speakerphone, an IP phone, a video conferencing unit, and a conference bridge.

9. The conference endpoint of claim 1, wherein the second conference endpoint is selected from the group consisting of a computer with a microphone and speaker, an audio communication device without the control module combined with a separate control module, a speakerphone, an IP phone, a video conferencing unit, and a conference bridge.

10. The conference endpoint of claim 1, further comprising:
a video processing unit communicably coupled to the network interface.

11. A conferencing system comprising:
a plurality of conference endpoints including a first conference endpoint and a second conference endpoint separated from the first conference endpoint; and
a communication channel having a communication protocol coupling the plurality of conference endpoints including the first conference endpoint and the second conference endpoint;
wherein the first conference endpoint comprises a first control module operable to provide control data in-band with audio data to the second conference endpoint;
wherein the control data comprises an instruction from the first conference endpoint that the second conference endpoint establish a second communication channel;
wherein the second conference endpoint establishes the second communication channel; and
wherein the control data is substantially humanly inaudible.

12. The conferencing system of claim 11, wherein the first conference endpoint is remote from the second conference endpoint.

13. The conferencing system of claim 11, wherein the second conference endpoint comprises a second control module operable to provide control data combined in-band with audio data to the first conference endpoint.

14. The conferencing system of claim 11, wherein the second communication channel comprises a video link.

15. The conferencing system of claim 11, wherein the first communication channel comprises a POTS connection.

16. The conferencing system of claim 11, wherein the first communication channel comprises an IP connection.

17. The conferencing system of claim 11, wherein the second communication channel comprises an IP connection.

18. The conferencing system of claim 11, wherein the communication protocol is selected from the group consisting of IP, modem data, local serial digital input/output, ISDN, and analog.

19. The conferencing system of claim 11, wherein the first conference endpoint is selected from the group consisting of a computer with a microphone and speaker, an audio communication device without the first control module combined with a separate control module, a speakerphone, an IP phone, a video conferencing unit, and a conference bridge.

20. The conferencing system of claim 11, wherein the second conference endpoint is selected from the group consisting of a computer with a microphone and speaker, an audio communication device combined with a separate control module, a speakerphone, an IP phone, a video conferencing unit, and a conference bridge.

21. A method for establishing a new communication channel during a conference, the method comprising the steps of:
combining a control signal in-band with an audio signal;
sending the combined audio and control signal to one or more conference endpoints; and
instructing the one or more conference endpoints to establish a new communication channel based on the control signal
wherein the control signal is substantially humanly inaudible.

22. The method of claim 21, wherein the combined audio and control signal is sent according to a communication protocol selected from the group consisting of IP, modem data, local serial digital input/output, ISDN, and analog.

23. A non-transitory, computer-readable medium comprising instructions executable by a computer to establish a new communication channel during a conference with one or more conference endpoints by performing the steps of:
combining a control signal in-band with an audio signal;
sending the combined audio and control signal to the one or more endpoints; and
instructing the one or more conference endpoints to establish a new communication channel based on the control signal;
wherein the control signal is substantially humanly inaudible.

24. The non-transitory, computer-readable medium comprising instructions executable by a computer of claim 23, wherein the combined audio and control signal is sent according to a communication protocol selected from the group consisting of IP, modem data, local serial digital input/output, ISDN, and analog.

* * * * *